United States Patent
Seo et al.

(10) Patent No.: US 10,203,761 B2
(45) Date of Patent: Feb. 12, 2019

(54) GLASS TYPE MOBILE TERMINAL

(71) Applicant: LG ELECTRONICS INC., Seoul (KR)

(72) Inventors: Jungtae Seo, Seoul (KR); Wonsang Yi, Seoul (KR); Chaemin Lim, Seoul (KR); Wonsul Jeon, Seoul (KR); Bomi Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1078 days.

(21) Appl. No.: 14/588,751

(22) Filed: Jan. 2, 2015

(65) Prior Publication Data
US 2015/0253862 A1    Sep. 10, 2015

(30) Foreign Application Priority Data
Mar. 6, 2014 (KR) .......................... 10-2014-0026505

(51) Int. Cl.
| | |
|---|---|
| *G06F 3/048* | (2013.01) |
| *G06F 3/01* | (2006.01) |
| *G06F 3/0482* | (2013.01) |
| *G06F 3/0486* | (2013.01) |
| *G06F 3/0488* | (2013.01) |

(52) U.S. Cl.
CPC .............. *G06F 3/017* (2013.01); *G06F 3/013* (2013.01); *G06F 3/0482* (2013.01); *G06F 3/0486* (2013.01); *G06F 3/0488* (2013.01)

(58) Field of Classification Search
CPC ........ G06F 3/017; G06F 3/013; G06F 3/0482; G06F 3/04842; G06F 3/0486; G06F 3/0488
See application file for complete search history.

(56) References Cited

U.S. PATENT DOCUMENTS

| 8,965,460 B1* | 2/2015 | Rao .......................... G06F 3/005 455/566 |
| 2010/0199232 A1* | 8/2010 | Mistry .................... G06F 1/163 715/863 |

(Continued)

FOREIGN PATENT DOCUMENTS

EP    1 865 404 A1 * 12/2007

*Primary Examiner* — William L Bashore
*Assistant Examiner* — Gregory A Distefano
(74) *Attorney, Agent, or Firm* — Birch, Stewart, Kolasch & Birch, LLP

(57) ABSTRACT

A glasses type mobile terminal including a camera configured to obtain an image; a display unit including a transparent display; and a controller configured to recognize a user is gazing at their hand, display an execution screen in a first transparent display area corresponding to a palm of the hand, recognize a first gesture corresponding to a virtual connection between the execution screen and a specific finger, associate the execution screen with the specific finger upon recognition of the first gesture, display a first item indicating association of the execution screen with the specific finger in a second transparent display area corresponding to the specific finger, recognize a second gesture of virtually connecting the first item with the displayed execution screen corresponding to the palm of the hand, and display a result of executing the first item to the application in the first transparent display area.

18 Claims, 32 Drawing Sheets

(56) References Cited

U.S. PATENT DOCUMENTS

| | | | |
|---|---|---|---|
| 2014/0266988 A1* | 9/2014 | Fisher | G02B 27/017 345/8 |
| 2015/0002475 A1* | 1/2015 | Tiao | G06F 3/0425 345/175 |
| 2015/0268799 A1* | 9/2015 | Starner | G02B 27/017 345/175 |

* cited by examiner

FIG. 4
[Change of user's gaze]
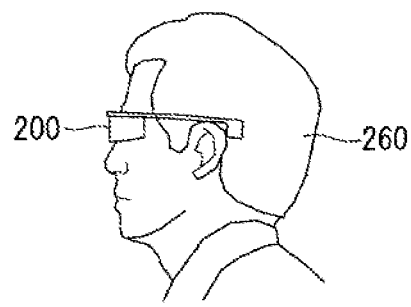
(a)
case1:
When hand is raised
case2:
When head is lowered
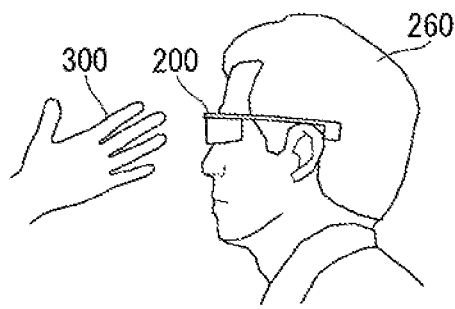
(b)
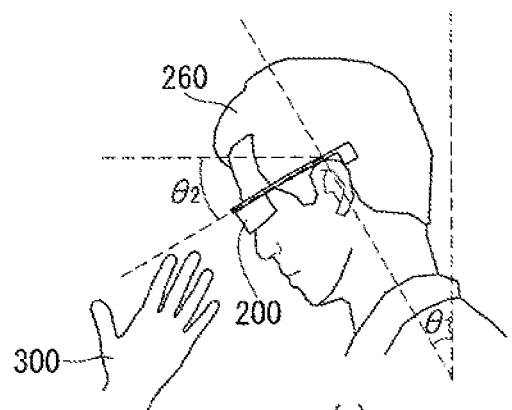
(c)

FIG. 22
(a)
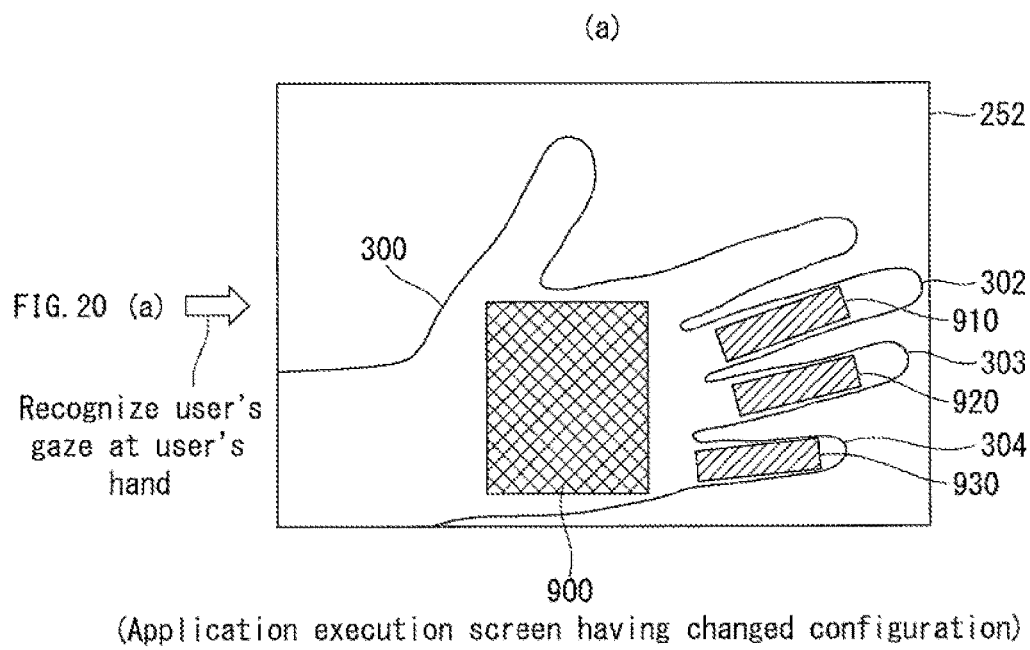
(Application execution screen having changed configuration)
(b)
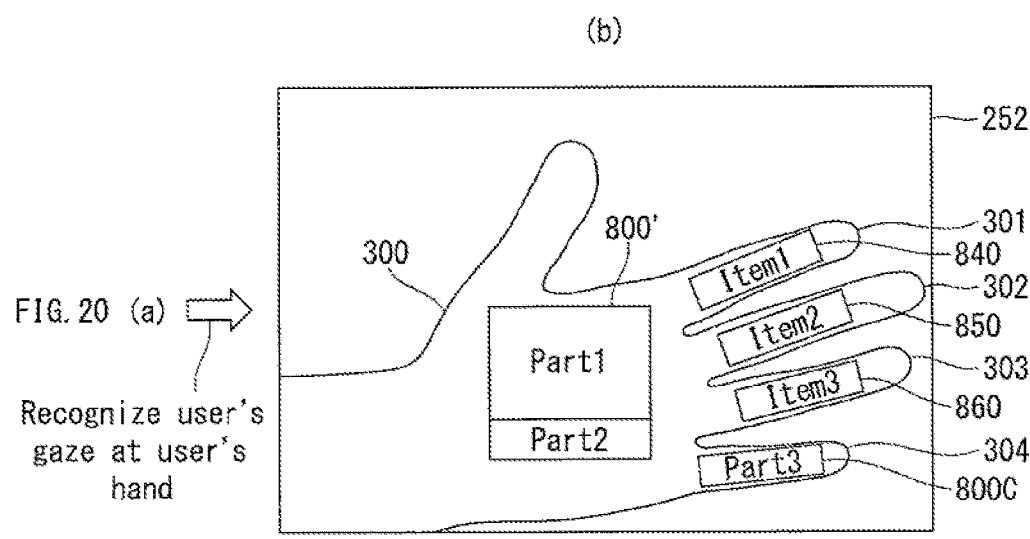

GLASS TYPE MOBILE TERMINAL

CROSS-REFERENCE TO RELATED APPLICATIONS

This application claims priority to Korean Patent Application No. 10-2014-0026505 filed on Mar. 6, 2014 in Korea, the entire contents of which are hereby incorporated by reference in their entirety.

TECHNICAL FIELD

The present invention relates to a mobile terminal, and more particularly, to a glass type mobile terminal and corresponding method for providing various user experience (UX) environments in consideration of gaze of a user.

DISCUSSION OF THE RELATED ART

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Further, there is increasing demand for wearable devices such as smart watches, smart glasses and head mounted displays in addition to handheld devices such as a smartphone, smart pad and the like and various products are released. Thus, various user environments for wearable devices are limited and only in the initial stage of development.

SUMMARY

Accordingly, an object of the present invention is to address the above-mentioned and other problems.

An object of the present invention is to provide various UX environments in a glass type mobile terminal, which is a representative wearable device.

Particularly, an object of the present invention is to provide a glass type mobile terminal for providing various UX environments using the palm and fingers of a user when user's gaze at the palm is recognized.

To accomplish the objects of the present invention, there is provided a glass type mobile terminal, including: a display unit in the form of a head mounted display, the display unit including a transparent display means; and a control module configured to display an execution screen of a currently executed application in a transparent display area corresponding to the palm of one hand of a user, upon recognition of user's gaze at the user's hand; to execute a specific function corresponding to a first gesture of associating the execution screen of the application with a specific finger of the user's hand and to display a first item indicating execution of the specific function in a transparent display area corresponding to the specific finger, upon recognition of the first gesture; and to apply a result of execution of the specific function to the application and to display a result of application of the result of execution of the specific function to the application in the transparent display area corresponding to the palm, upon recognition of a second gesture of associating the first item with the application.

To accomplish the objects of the present invention, there is also provided a glass type mobile terminal, including: a display unit in the form of a head mounted display, the display unit including a transparent display means; and a control module configured to distribute and display an execution screen of an application to/in a first transparent display area corresponding to the palm of one hand of a user and a second transparent display area corresponding to at least one finger of the user's hand, upon recognition of user's gaze at the user's hand.

To accomplish the objects of the present invention, there is provided a glass type mobile terminal, including: a display unit in the form of a head mounted display, the display unit including a transparent display means; and a control module configured to stop execution of an application, to execute a bookmarking function for an execution screen of the application and to display a preview image with respect to the bookmarked application execution screen in a transparent display area corresponding to the palm of one hand of a user, upon recognition of user's gaze at the user's hand while the execution screen of the application is displayed in a predetermined transparent display area, wherein the control module is configured to resume execution of the application and to display the execution screen of the application in the predetermined transparent display area upon release of user's gaze at the palm of the user.

The glass type mobile terminal and control method thereof according to an embodiment of the present invention have the following advantages.

According to at least one embodiment of the present invention, when a user gazes at their palm, various intuitive UX environments can be provided through a transparent display area corresponding to the palm and fingers of the user.

According to at least one embodiments of the present invention, various functions can be intuitively executed through UX environments provided through the palm and fingers of the user.

According to at least one embodiment of the present invention, a specific function can be executed through a user gesture of gazing at their palm.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein-below and the accompanying drawings, which are given by illustration only, and thus are not limitative of the present invention, wherein:

FIG. 4 includes overviews illustrating examples of gaze of a user wearing a glass type mobile terminal at their palm;

FIGS. 20 to 22 include overviews illustrating examples of displaying an application execution screen in a distributed manner according to the method for controlling the glass type mobile terminal shown in FIG. 19;

DETAILED DESCRIPTION OF THE PREFERRED EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
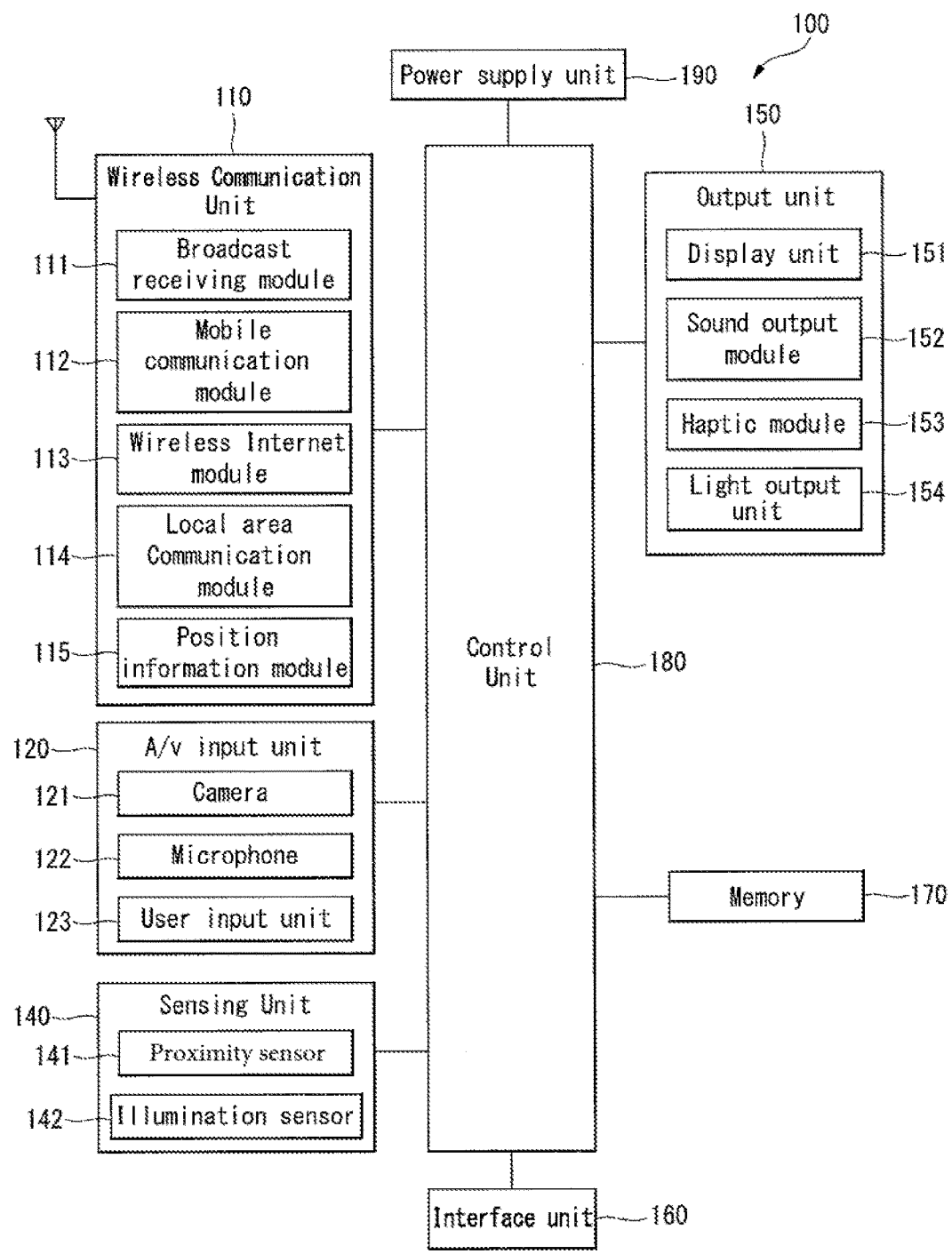
FIG. 1A is a block diagram of a mobile terminal according to an embodiment of the present invention.
Figure 1B:
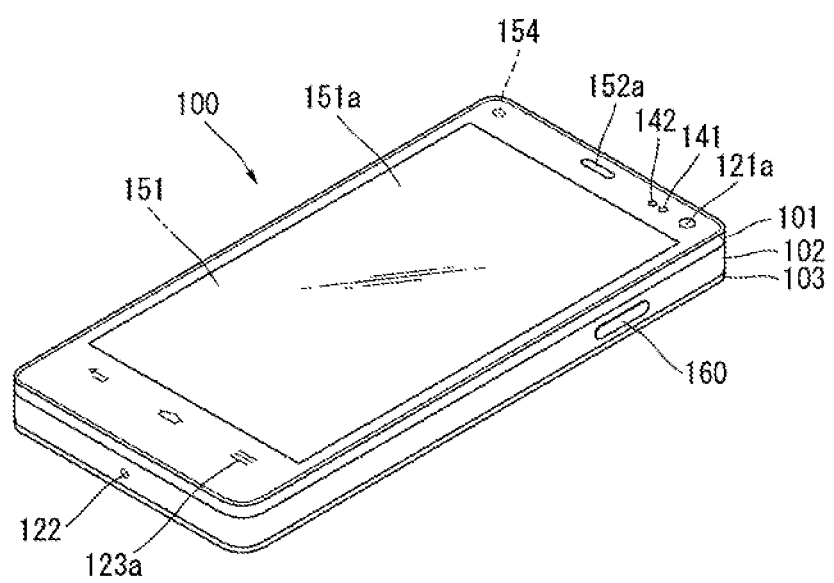
FIGS. 1B and 1C are conceptual views of one example of the mobile terminal, viewed from different directions.
Figure 1C:
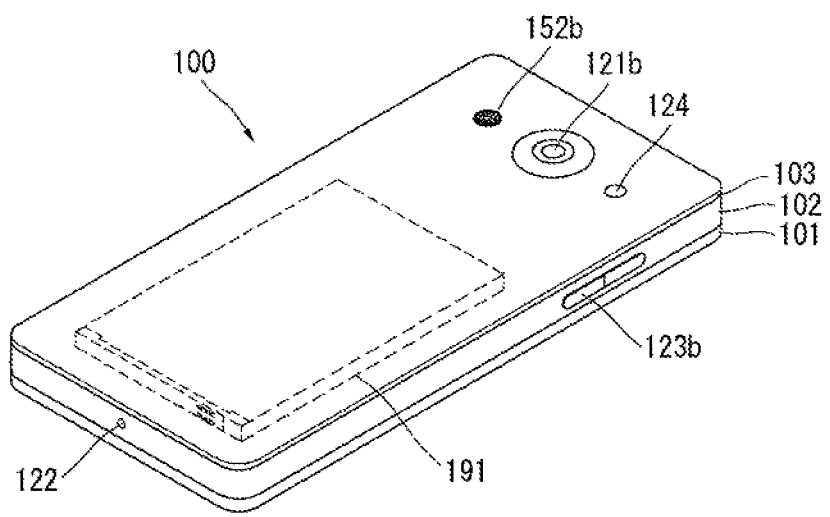

Reference is now made to FIGS. 1A-1C, where FIG. 1A is a block diagram of a mobile terminal according to an embodiment of the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. A posture sensor can also be included to sense a posture of the user with respect to the mobile terminal via a gaze direction of the user, etc.

If desired, the sensing unit 140 may alternatively or additionally include other types of sensors or devices, such as a touch sensor, an acceleration sensor, a magnetic sensor, a C-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DENA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE). LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content Which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
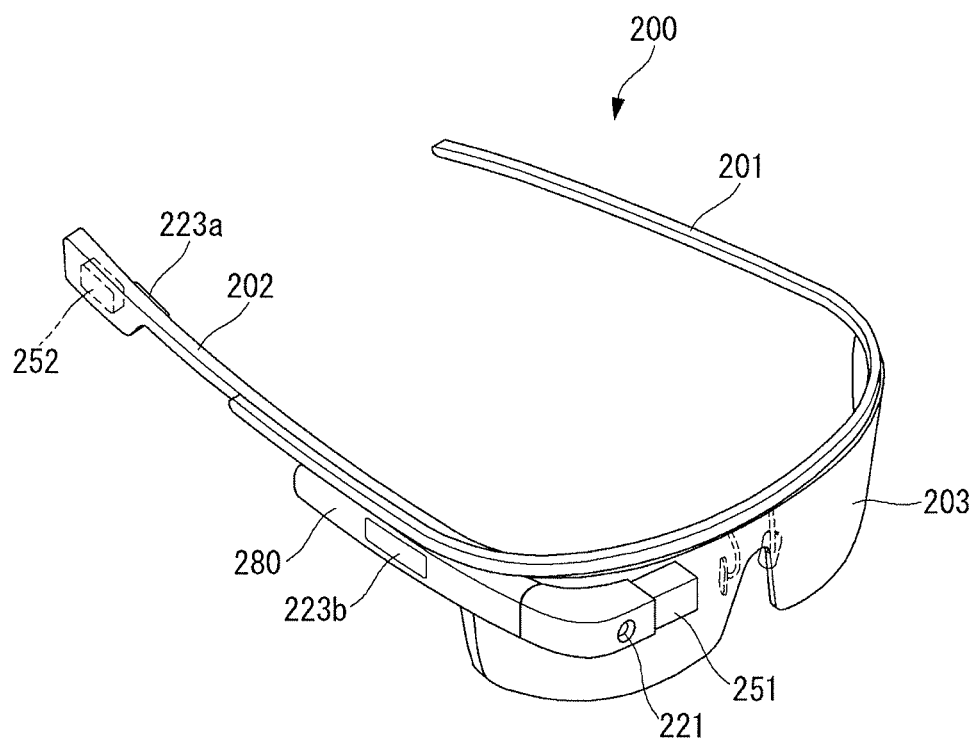
FIG. 2 is a conceptual view of a wearable mobile terminal according to another alternative embodiment of the present invention.

FIG. 2 is a perspective view illustrating one example of a glass-type mobile terminal 200 according to another embodiment. The glass-type mobile terminal 200 can be wearable on a head of a human body and provided with a frame (case, housing, etc.) therefor. The frame may be made of a flexible material to be easily worn. The frame of mobile terminal 200 is shown having a first frame 201 and a second frame 202, which can be made of the same or different materials. In general, mobile terminal 200 may be configured to include features that are the same or similar to that of mobile terminal 100 of FIGS. 1A-1C.

The frame may be supported on the head and defines a space for mounting various components. As illustrated, electronic components, such as a control module 280, an audio output module 252, and the like, may be mounted to the frame part. Also, a lens 203 for covering either or both of the left and right eyes may be detachably coupled to the frame part.

The control module 280 controls various electronic components disposed in the mobile terminal 200. The control module 280 can be understood as a component corresponding to the aforementioned controller 180. FIG. 2 illustrates that the control module 280 is installed in the frame part on one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 can project an image into the user's eye using a prism. Also, the prism may be formed from optically transparent material such that the user can view both the projected image and a general visual field (a range that the user views through the eyes) in front of the user. In such a manner, the image output through the display unit 251 may be viewed while overlapping with the general visual field. The mobile terminal 200 can provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing. The camera 221 may be positioned at most any location of the mobile terminal. In some embodiments, multiple cameras 221 may be utilized. Such multiple cameras 221 may be used to acquire a stereoscopic image.

The glass-type mobile terminal 200 may include user input units 223a and 223b, which can each be manipulated by the user to provide an input. The user input units 223a and 223b may employ techniques which permit input via a tactile input. Typical tactile inputs include a touch, push, or the like. The user input units 223a and 223b are shown operable in a pushing manner and a touching manner as they are located on the frame part and the control module 280, respectively.

If desired, mobile terminal 200 may include a microphone which processes input sound into electric audio data, and an audio output module 252 for outputting audio. The audio output module 252 may be configured to produce audio in a general audio output manner or an osteoconductive manner. When the audio output module 252 is implemented in the osteoconductive manner, the audio output module 252 may be closely adhered to the head when the user wears the mobile terminal 200 and vibrate the user's skull to transfer sounds.

Figure 3:
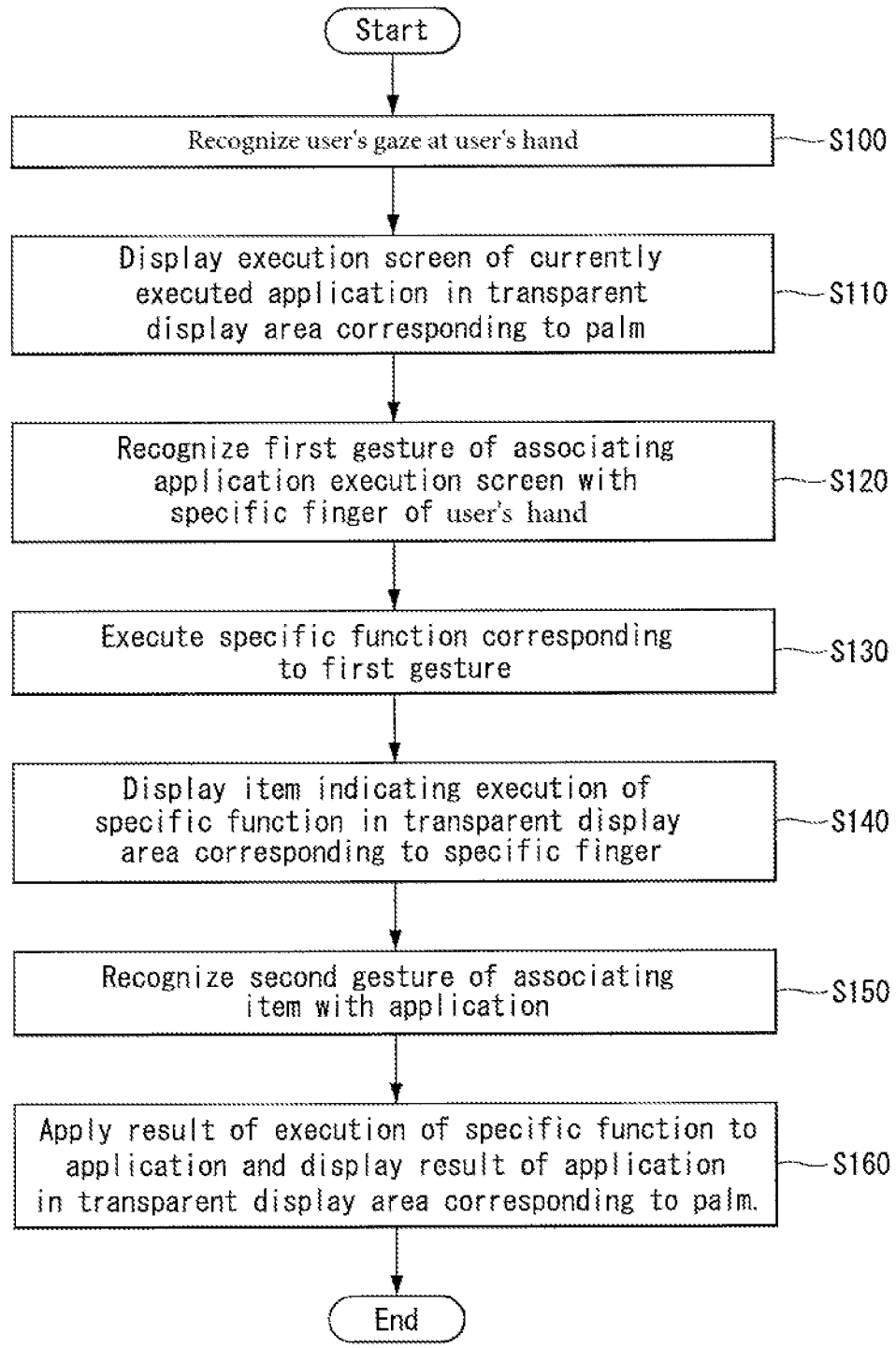
FIG. 3 is a flowchart illustrating a method for controlling a glass type mobile terminal according to an embodiment of the present invention.

Next, FIG. 3 is a flowchart illustrating an example of a method for controlling the glass type mobile terminal 200 according to an embodiment of the present invention. In particular, the control module 280 of the glass type mobile terminal 200 recognizes the user's gazing at their hand (S100). The control module 280 can analyze an image captured by a camera 221 that captures a front image when worn by the user and use the image to recognize the user's gazing at their hand.

In addition, the control module 280 can analyze an image captured by a camera capable of photographing the eyes of the user and use the analysis result to recognize the user's gazing at their hand. Furthermore, the control module 280 can analyze data sensed by various sensors for sensing the posture or position of the glass type mobile terminal 200 or the user and use the analysis result to recognize user's gazing at their hand. Examples of data that can be used for the control module 280 to recognize user's gazing at the hand are not limited to the aforementioned examples.

FIG. 4 includes overviews illustrating examples of a gaze of a user at their hand who wears the glass type mobile terminal 200. FIG. 4(a) shows that the user looking forward. When the user raises their hand 300 in the state of FIG. 4(b), the control module 280 can recognize the user's gaze at their hand 300. When the user lowers their head in the state of FIG. 4(c), the control module 280 can recognize the user's gaze at their hand.

Here, the control module 281) can use a result of analysis of an image captured by the camera 421. In the example shown in FIG. 4(c), the control module 280 can use angles θ1 and θ2 that can be obtained by various sensors provided to the glass type mobile terminal 200 to recognize the user's gazing at their hand. The process in which the user gazes at their hand is not limited to the aforementioned example. For example, the user can gaze at their hand by raising their hand and at the same time as lowering their head.

Referring again to FIG. 3, upon recognition of user's gazing at their hand, the control module 280 displays an execution screen of an application being executed on a transparent display area corresponding to the palm at which the user gazes (S110). The position or area of the region in which the application execution screen is displayed may be changed from the position or area of the region before recognition of user's gazing at their hand. Furthermore, the region in which the application execution screen is displayed may be part or all of the transparent display area of the HMD.

Figure 5:
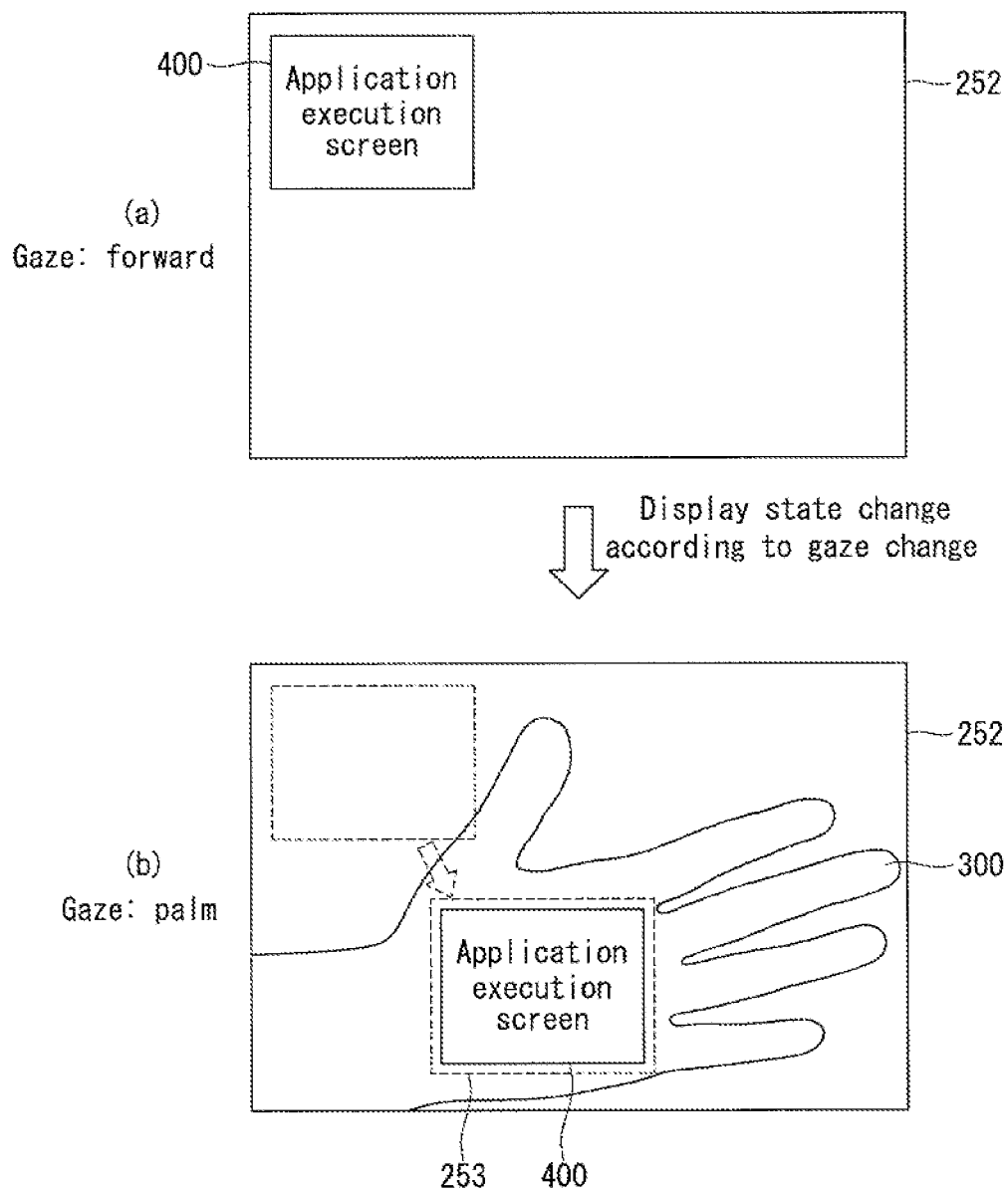
FIG. 5 includes overviews illustrating an example of changing an execution screen of an application being executed when user's gaze at their palm is recognized.

FIG. 5 illustrates an example of changing the position of an execution screen of an application being executed when the user's gazes at their palm is recognized. FIG. 5(a) shows that the application execution screen 400 is displayed in the upper region of the left side of a transparent display area 252 of the display 231 when the user does not gaze at their hand since the user keeps their eyes forward. Upon recognition of the user's gazing at their hand 300 in the state of FIG. 5(b), the control module 280 can display the display 231 the application execution screen in the transparent display area 253 corresponding to the user's hand.

The area of the transparent display area corresponding to the user's hand 300 may be varied according to a distance between the user's hand and the glass type mobile terminal 200. For example, the area of the transparent display area corresponding to their hand 300 can increase as the distance between the user's hand and the glass type mobile terminal 200 decreases. That is, the size of the application execution screen displayed in the transparent display area can be varied according to the distance between the user's hand and the glass type mobile terminal 200.

In addition, the position of the transparent display area corresponding to the user's hand may be varied according to the position of the user's hand. For example, when the user's hand moves from the left to the right of the transparent display area 252, the control module 280 can move the position of the transparent display area corresponding to the user's palm from the left to the right of the transparent display area. That is, the position of the application execution screen displayed in the transparent display area can be varied according to the position of the user's hand.

Figure 6:
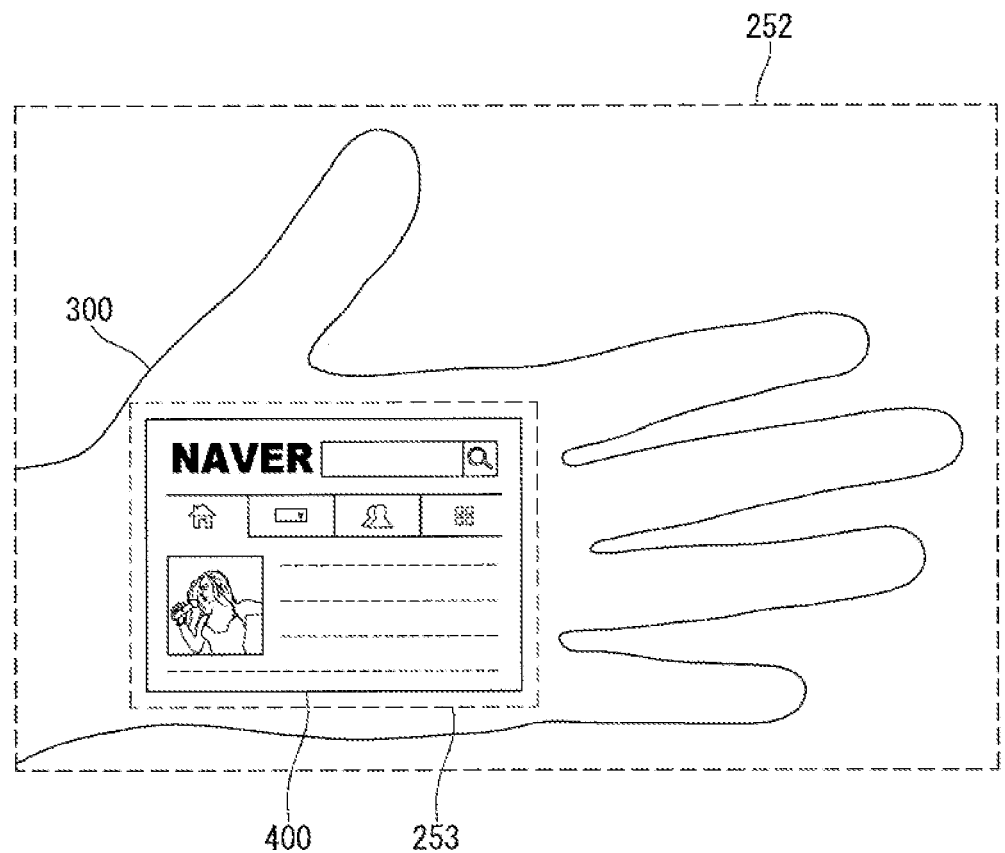
FIG. 6 is an overview illustrating an example of displaying an application execution screen on a transparent display area corresponding to the user's palm according to the method for controlling the glass type mobile terminal shown in FIG. 3.

FIG. 6 illustrates an example of displaying the application execution screen 400 in the transparent display area 253 corresponding to the user's palm according to the method for controlling the glass type mobile terminal 200 shown in FIG. 3. Referring to FIG. 6, the execution screen 400 of a web browsing application being executed in the glass type mobile terminal 200 is displayed in the transparent display area 253 corresponding to the user's palm, which is part of the whole transparent display area 252 of the display 231.

Referring again to FIG. 3, while the application execution screen is displayed in the transparent display area corresponding to the user's palm, the control module 280 recognizes a first gesture of associating the application execution screen with a specific finger of the user's hand (S120). Here, the first gesture may be a user's motion of touching the specific finger with a finger of the other hand while the application execution screen is displayed in the transparent display area corresponding to the user's palm.

The first gesture may be a user's gesture of dragging a virtual touch of the user, applied to the application execution screen, to the region corresponding to the specific finger using a finger of the other hand of the user. In addition, the first gesture may be a user's gesture of dragging virtual touch of the user, applied to the region corresponding to the specific finger, to the application execution screen using a finger of the other hand.

Otherwise, the first gesture may include a specific user gesture using the specific finger. For example, the first gesture may be a gesture of bending the specific finger or a gesture of bending and then un-bending the specific finger. The control module 280 can recognize the first gesture by analyzing an image captured by the camera 221. The first gesture recognized by the glass type mobile terminal 200 according to an embodiment of the present invention is not limited to the aforementioned examples.

Upon recognition of the first gesture, the control module 280 executes a specific function corresponding to the first gesture (S130) and displays an item indicating that the specific function has been executed in the transparent display area corresponding to the specific finger (S140). Here, the specific function may depend on the type of the executed application or execution state of the application.

Figure 7:
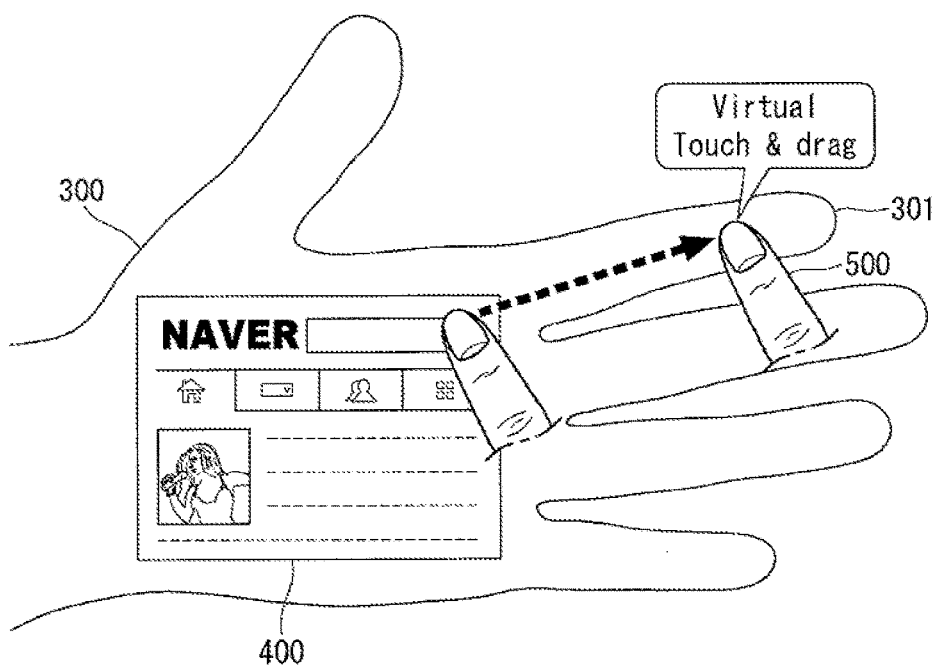
FIG. 7 is an overview illustrating an example of a first gesture of associating the application execution screen with a specific finger of the user according to the method for controlling the glass type mobile terminal shown in FIG. 3.
Figure 8:
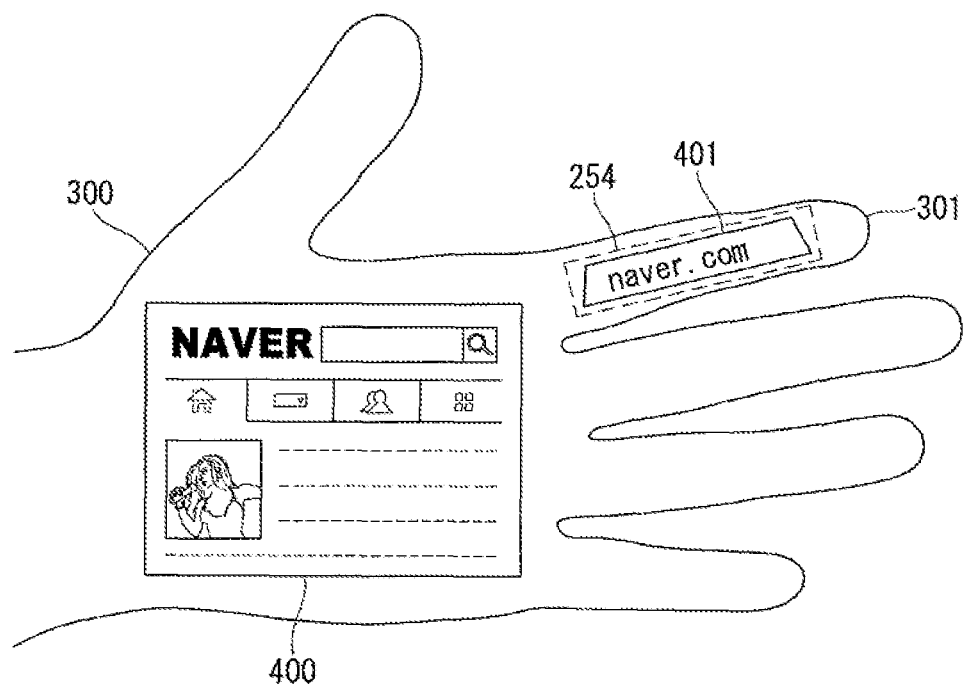
FIG. 8 is an overview illustrating an example of displaying a first item indicating that a specific function has been executed on the basis of the first gesture on the transparent display area corresponding to the specific finger of the user according to the method for controlling the glass type mobile terminal shown in FIG. 3.

FIG. 7 illustrates an example of the first gesture of associating the application execution screen to the specific finger according to the method for controlling the glass type mobile terminal 200 shown in FIG. 3, and FIG. 8 illustrates an example of displaying a first hem indicating that the specific function has been executed based on the first gesture in the transparent display area corresponding to the specific finger according to the method for controlling the glass type mobile terminal 200 shown in FIG. 3.

FIG. 7 includes an overview illustrating the first gesture of dragging a virtual touch of the user, applied to the web browsing application execution screen, to a region corresponding to the index finger 301 of the user using a finger 500 of the right hand of the user. This touch and drag is merely a motion of the finger 500 in the space rather than operation applied to the display. Accordingly, this operation is referred to as "drag for virtual touch" in the specification.

The virtual touch and drag may include direct touch applied to the palm or a finger. In this instance, the user can definitely feel the virtual touch and drag. Simple touch may also be directly applied to the palm or a finger such that the user can feel the touch.

The control module 280 executes a bookmarking function on the web browsing application execution screen. Then, the control module 280 can display an hem 401 indicating a bookmarking result in the transparent display area 254 corresponding to the index finger 301 of the user, as shown in FIG. 8.

As described with reference to FIGS. 7 and 8, when the executed application is the web browsing application, the specific function corresponding to the first gesture may be the bookmarking function with respect to a currently accessed webpage. However, the specific function corresponding to the first gesture is not limited to the bookmarking function. For example, the function corresponding to the first gesture may be an execution screen capture function.

Figure 9:
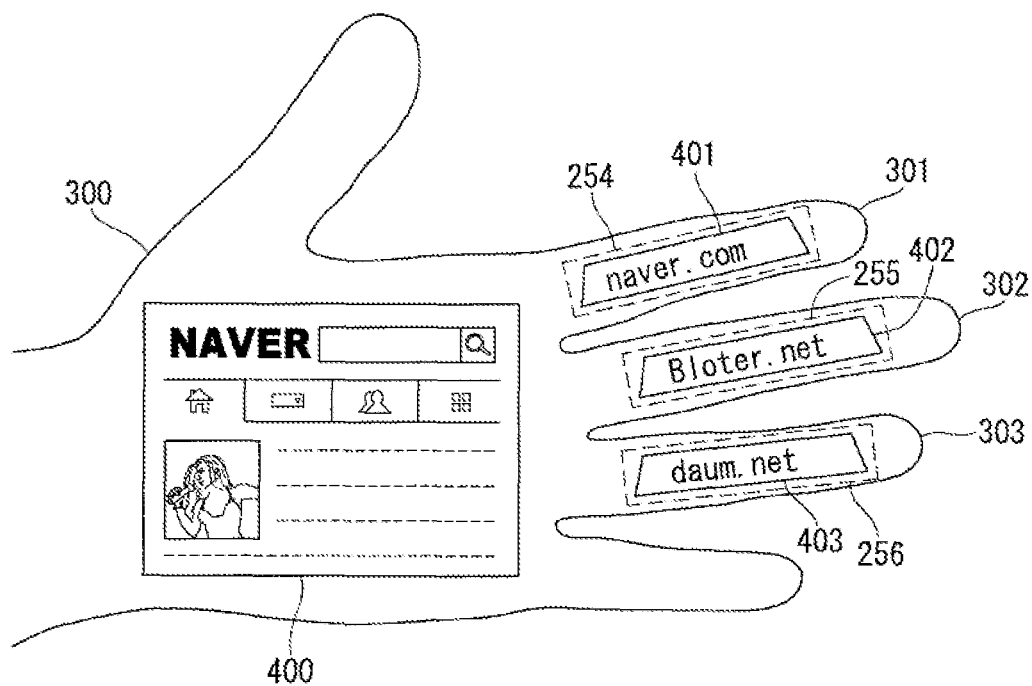
FIG. 9 is an overview illustrating an example of displaying items indicating that specific functions have been executed for a plurality of fingers of the user according to the method for controlling the glass type mobile terminal shown in FIG. 3.

FIG. 9 illustrates an example of displaying items indicating that specific functions have been executed for a plurality of fingers according to the method for controlling the glass type mobile terminal 200 shown in FIG. 3. Referring to FIG. 9, an item 401 indicating a bookmarking result with respect to the webpage "Naver" may be displayed in a transparent display area 254 corresponding to the index finger 301 of the user, an item 402 indicating a bookmarking result with respect to the webpage "Blotter.net" may be displayed in a transparent display area 255 corresponding to the middle finger 302 of the user and an item 403 indicating a bookmarking result with respect to another webpage may be displayed in a transparent display area 256 corresponding to the ring finger 303 of the user.

Referring again to FIG. 3, a second gesture of associating the first time with the application is recognized while the item indicating that the specific function has been executed is displayed in the transparent display area corresponding to the specific finger (S150). Here, the second gesture may include the first gesture described in step S120. Otherwise, the second gesture may include a gesture other than the first gesture.

Upon recognition of the second gesture, the control module 280 applies the result of execution of the specific function to the application and displays the application result in the transparent display area corresponding to the user's palm (S160).

Figure 10:
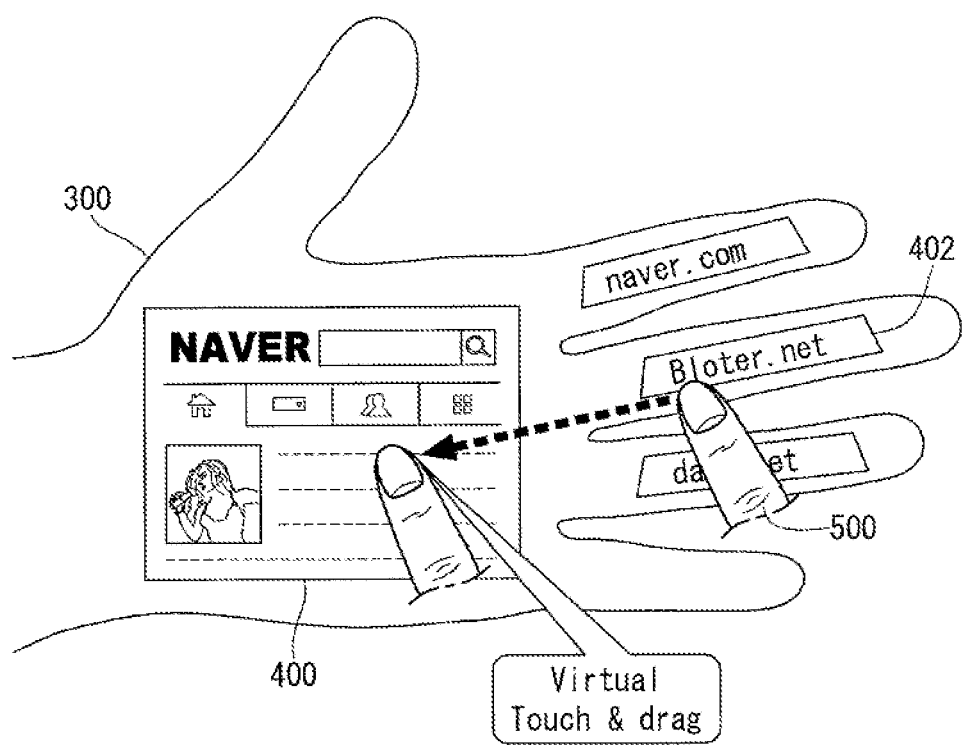
FIGS. 10 and 11 are overviews illustrating an example of application of a result of execution of a specific function corresponding to a specific finger of the user to an application being executed when a second gesture is recognized according to the method for controlling the glass type mobile terminal shown in FIG. 3.
Figure 11:
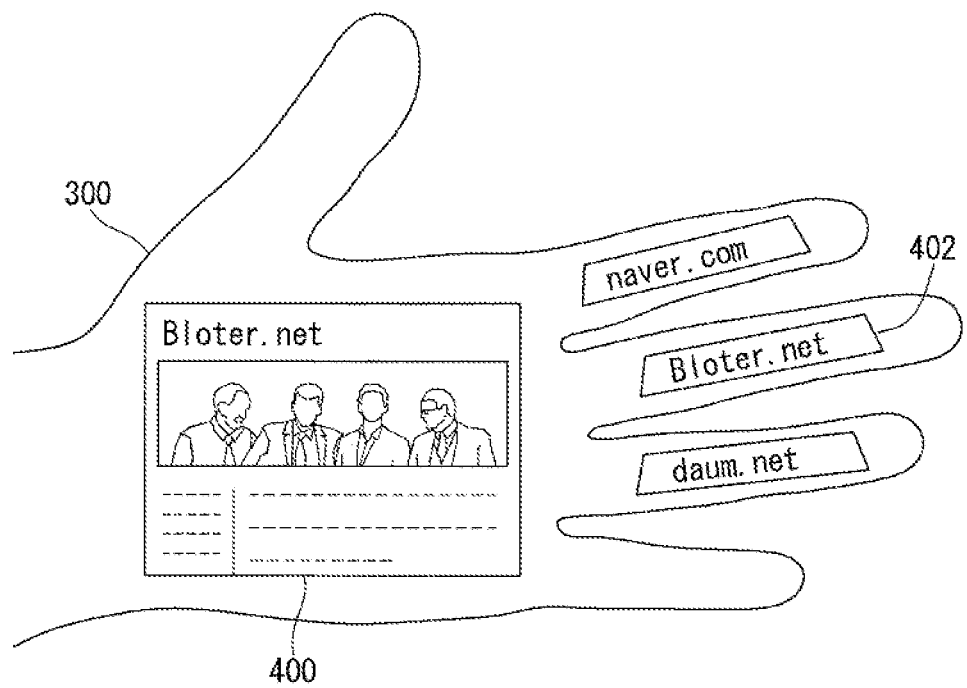

FIGS. 10 and 11 includes overviews illustrating an example of application of the result of execution of the specific function corresponding to the specific finger to the executed application upon recognition of the second gesture according to the method for controlling the glass type mobile terminal 200 shown in FIG. 3. FIG. 10 shows that the user performs the second gesture of dragging a virtual touch applied to the item 402 indicating that the bookmarking function with respect to the webpage "Blotter.net" displayed in the transparent display area corresponding to the middle finger of the left hand 300 to the execution screen 400 of the web browsing application using a finger 500 of the right hand.

Then, the control module 280 can apply the result of execution of the bookmarking function with respect to the webpage "Blotter.net" to the web browsing application and display the homepage of "Blotter.net" on the execution screen 400 of the web browsing application as an application result, as shown in FIG. 11.

Figure 12:
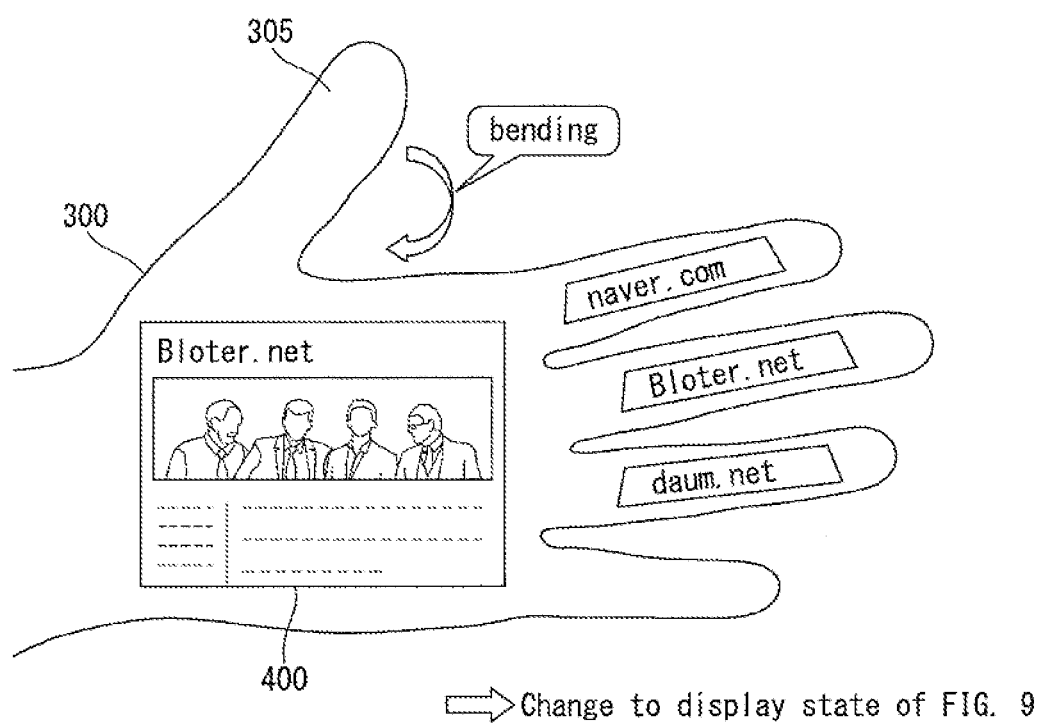
FIG. 12 is an overview illustrating an example of control operation using a finger of the user, performed in the glass type mobile terminal according to an embodiment of the present invention.

FIG. 12 is an overview illustrating a control operation using a finger performed in the glass type mobile terminal 200. FIG. 12 shows that the user performs a gesture of bending the thumb 305 while the web browsing application execution screen 400 is displayed in the transparent display area corresponding to the user's palm. This gesture may also include a motion of un-bending the thumb 305. That is, the gesture indicated by "bending" in FIG. 12 may refer to only bending a specific finger or bending and then un-bending the specific finger.

Upon recognition of the gesture "bending", the control module 280 can change the display state of the web browsing application execution screen 400 to the display state of FIG. 9 in which the homepage of "Naver", which is set to the initial screen of the web browsing application, is displayed. This function of returning to the initial screen may performed by bending another finger.

Figure 13:
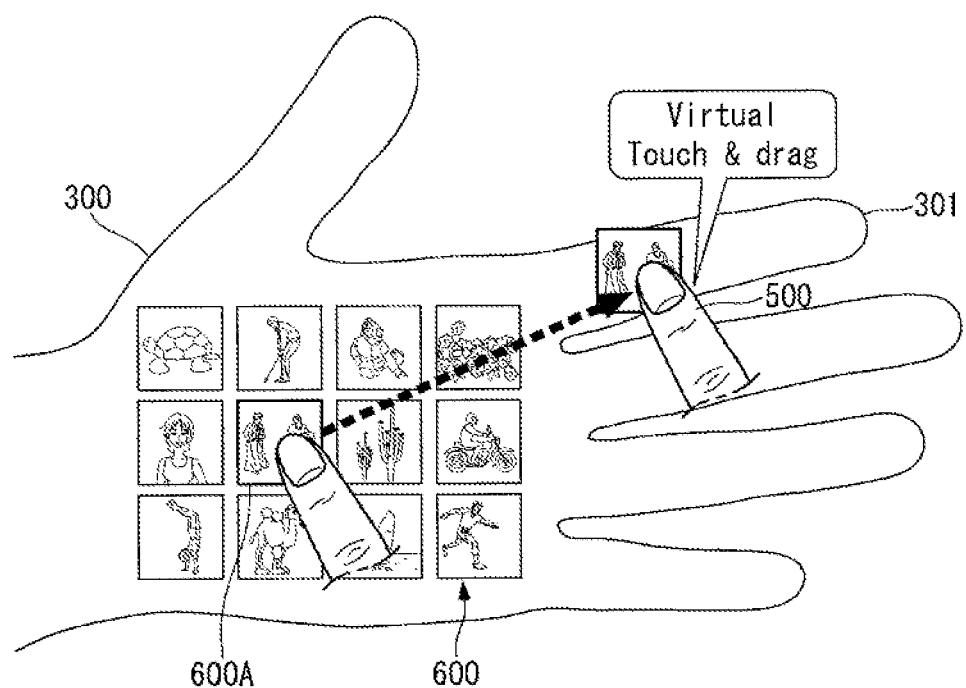
FIG. 13 is an overview illustrating another example of the first gesture of associating an application execution screen with a specific finger of the user according to the method for controlling the glass type mobile terminal shown in FIG. 3.
Figure 14:
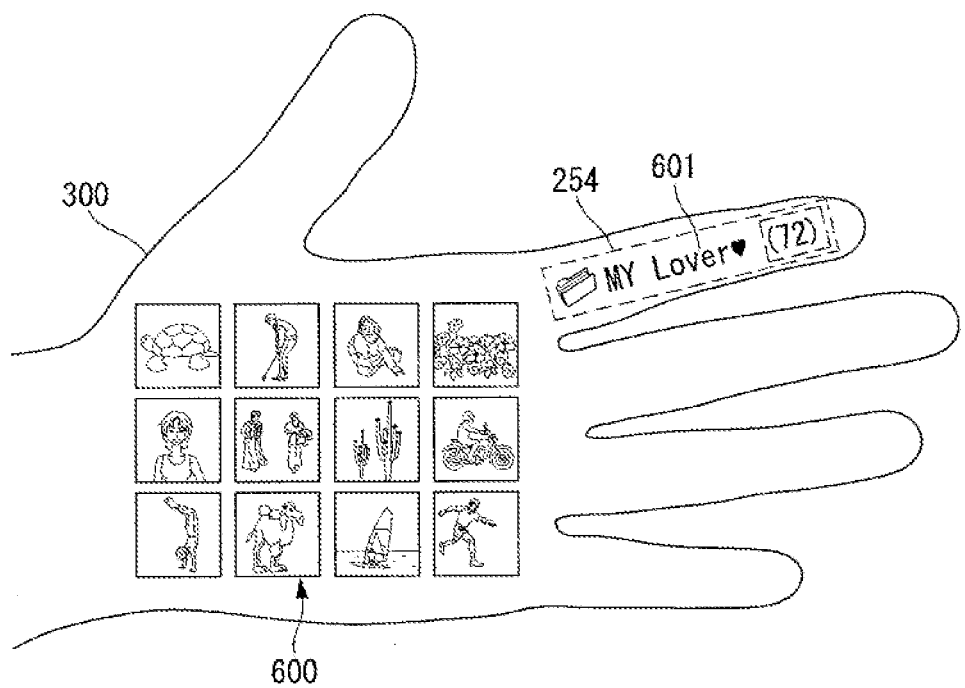
FIG. 14 is an overview illustrating another example of displaying the first item indicating that a specific function has been executed on the basis of the first gesture on the transparent display area corresponding to the specific finger of the user according to the method for controlling the glass type mobile terminal shown in FIG. 3.

FIG. 13 illustrates another example of the first gesture of associating the application execution screen to the specific finger according to the method for controlling the glass type mobile terminal 200 shown in FIG. 3. FIG. 14 illustrates another example of displaying the first item indicating that the specific function has been executed in the transparent display area corresponding to the specific finger based on the first gesture according to the method for controlling the glass type mobile terminal 200 shown in FIG. 3.

FIG. 13 shows that the user performs the first gesture of dragging a virtual touch applied to an execution application 600 of a gallery application, which is displayed in the transparent display area corresponding to the palm of the left hand, to a region corresponding to the index finger 301 using one finger 500 of the right hand. More specifically, the first gesture is performed on a second item (i.e. specific picture 600A) displayed in the gallery application execution screen 600.

Then, the control module 280 stores the specific picture 600A in a specific folder corresponding to the index finger 301. In addition, the control module 280 can display an item 601 indicating the storage result in the transparent display area 254 corresponding to the index finger 301, as shown in FIG. 14. Referring to FIG. 14, the item 601 displayed in the transparent display area 254 corresponding to the index finger 301 indicates that the selected picture 600A is stored in a "MY Lover ♥" folder and the number of images stored in the folder reaches 72.

As described above with reference to FIGS. 13 and 14 when the executed application corresponds to the gallery application, the specific function corresponding to the first gesture may be a function of storing a selected image in the folder corresponding to the finger. However, the specific function corresponding to the first gesture is not limited to the storage function. For example, the function corresponding to the first gesture can be a function of deleting a selected image.

Figure 15:
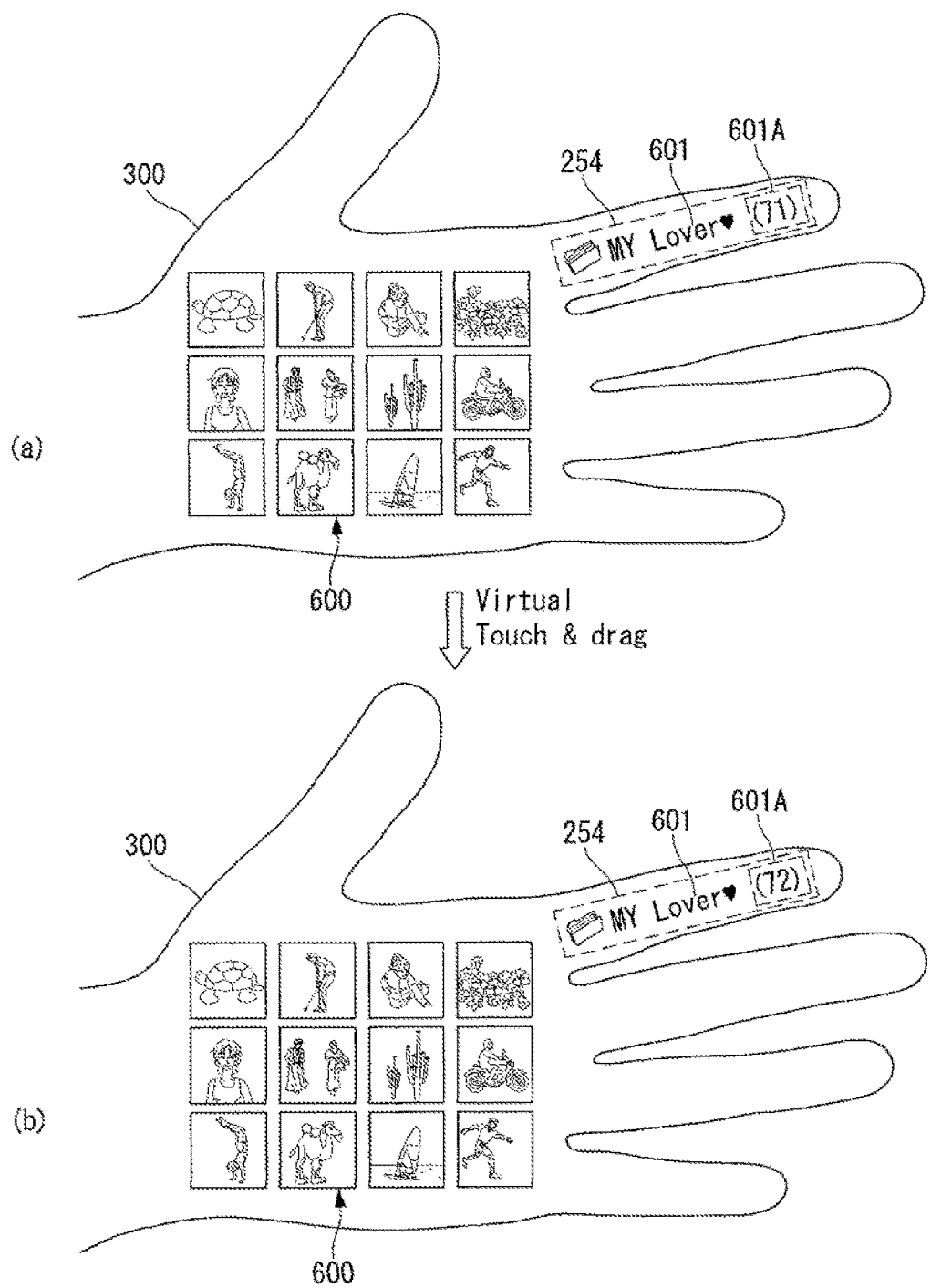
FIG. 15 includes overviews illustrating an example of changing display of an item on a finger of the user according to the method for controlling the glass type mobile terminal according to an embodiment of the present invention.

FIG. 15 illustrates an example of changing display of an item displayed on a finger according to the method for controlling the glass type mobile terminal 200 according to an embodiment of the present invention. FIG. 15(a) shows a display state prior to virtual touch and drag applied to the specific picture 600A in the example described with reference to FIGS. 13 and 14. Referring to FIG. 15(a), a third item 601 indicating that 71 images are stored in "MY Lover ♥" folder may be displayed in the transparent display area 254 corresponding to the index finger.

When the user applies virtual touch and drag to the picture 600A in the state shown in FIG. 15(a), the control module 280 stores the selected picture 600A in "MY Lover ♥" folder and changes display state of the item 601 by considering additional storage of the selected picture 600A, as shown in FIG. 15(b). Referring to FIGS. 15(a) and 15(b), upon virtual touch and drag operation of the user, a number 601A indicating the number of stored images is changed from "71" to "72".

As described above, upon recognition of the first gesture applied to an execution screen (or an item displayed on the execution screen) displayed in the virtual display area corresponding to the user's palm while the third item associated with the specific function corresponding to the first gesture is displayed in the transparent display area corresponding to the specific finger, the control module 280 can execute the specific function and change the display state of the third item by reflecting the result of the execution of the specific function in the display state. Here, the third item in the changed display state corresponds to the first item in the aforementioned embodiments.

Figure 16:
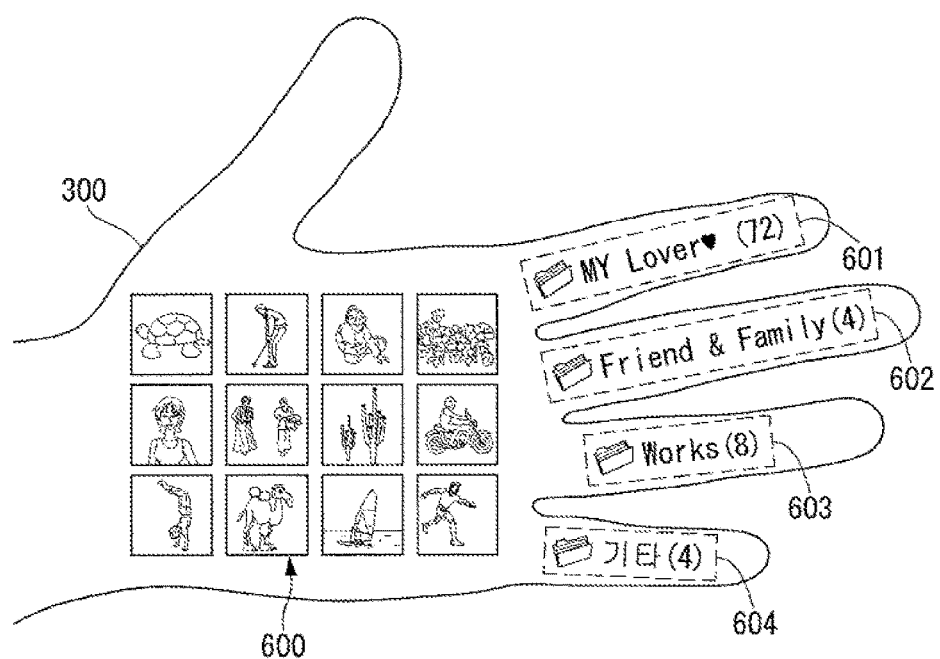
FIG. 16 is an overview illustrating another example of displaying items indicating that specific functions have been executed for a plurality of fingers of the user according to the method for controlling the glass type mobile terminal shown in FIG. 3.

FIG. 16 illustrates an example of displaying items indicating that specific functions have been executed for a plurality of fingers according to the method for controlling the glass type mobile terminal 200 shown in FIG. 3. Referring to FIG. 16, the item 601 indicating that the function of storing a selected picture has been executed for the "MY Lover ♥" folder is displayed in the transparent display area corresponding to the index finger, an item 602 indicating that a function of storing a selected image has been executed for a "Friends & Family" folder is displayed in the transparent display area corresponding to the middle finger, an item 603 indicating that a function of storing a selected image has been executed for a "Work" folder is displayed in the transparent display area corresponding to the ring finger, and an item 604 indicating that a function of storing a selected image has been executed for an "Other" folder is displayed in the transparent display area corresponding to the little finger.

The items 601 to 604 may be the third item described above with reference to FIG. 15. The items 601 to 604 displayed corresponding to the fingers may indicate states prior to execution of the function of storing selected images.

Figure 17:
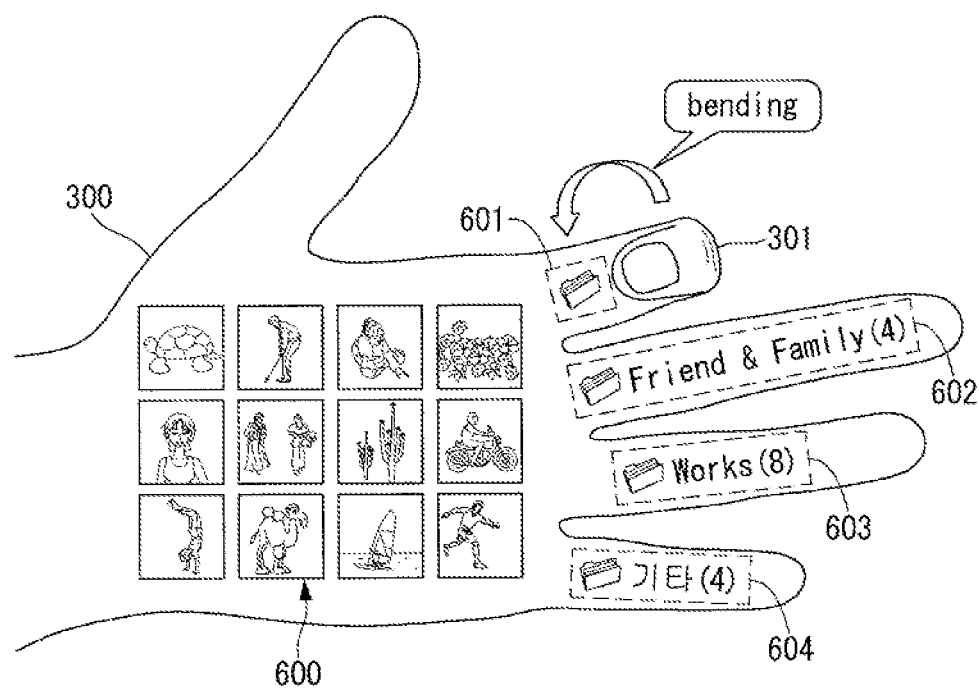
FIG. 17 is an overview illustrating another example of application of a result of execution of a specific function corresponding to a specific finger of the user to an application being executed when the second gesture is recognized according to the method for controlling the glass type mobile terminal shown in FIG. 3.

FIG. 17 illustrates another example of application of the result of the execution of the specific function corresponding to the specific finger upon recognition of the second gesture to the executed application according to the method for controlling the glass type mobile terminal 200 shown in FIG. 3. FIG. 17 shows that the control unit 280 displays the open screen 600 of the gallery application for the "MY Lover ♥" folder corresponding to the index finger 301, which is displayed in the transparent display area corresponding to the user's palm, upon the second gesture of bending the index finger 301 of the left hand 300 of the user.

The display state prior to recognition of the second gesture may correspond to the display state shown in FIG. 16. Referring to FIGS. 16 and 17, when the virtual display area corresponding to the index finger is reduced according to the gesture of bending the index finger, the display region of the first item in the virtual display area is also reduced. When the user unbends the index finger, the display region of the first item is widened.

The open screen 600 is a result of application of the result of storage of the selected picture 600A in "MY Lover ♥" folder corresponding to the index finger to the executed gallery application. That is upon recognition of the second gesture applied to the first item displayed on a specific finger, the glass type mobile terminal 200 according to an embodiment of the present invention can apply the result of execution of the specific function according to the first gesture to the executed application and display the result of application in the transparent display area corresponding to the user's palm.

Figure 18:
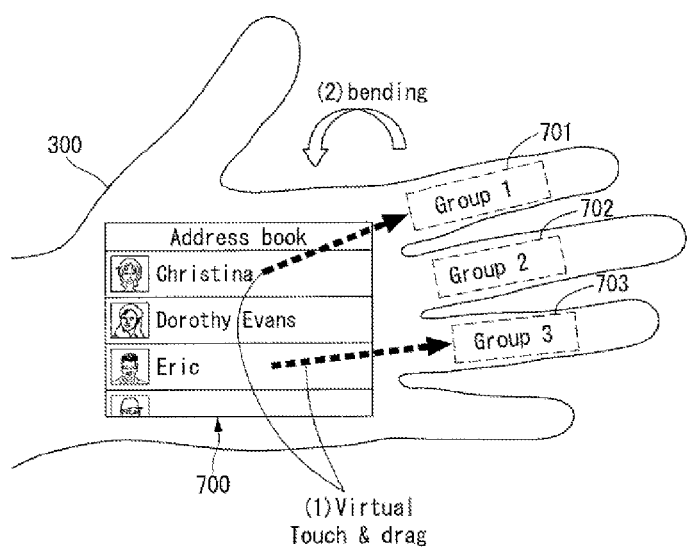
FIG. 18 is an overview illustrating an example of control operation using a finger of the user, performed in the glass type mobile terminal according to an embodiment of the present invention.

FIG. 18 includes an overview illustrating a control operation using a finger, which is performed in the glass type mobile terminal 200 according to an embodiment of the present invention. FIG. 18 shows that the user can perform the first gesture of dragging a virtual touch applied to specific address information to specific fingers to set the specific address information to specific groups Group 1, Group 2 and Group 3 while an execution screen 700 of an address book application is displayed in the virtual display area corresponding to the user's palm.

In the example of FIG. 18, items 701, 702 and 703 displayed in transparent display areas corresponding to fingers may indicate an address book information grouping result or may be displayed prior to execution of address book grouping. The user may perform the second gesture of bending a specific: finger to display information about an address book group corresponding to the specific finger in the transparent display area corresponding to the user's palm.

According to the example shown in FIG. 18, the user of the glass type mobile terminal 200 can easily arrange an address book using a finger without a separate tool. In addition, the user can easily check address hook information included in a specific group only with a simple operation using a finger. The glass type mobile 200 terminal according to an embodiment of the present invention may not provide the items 701, 702 and 703 indicating the groups corresponding to fingers. In this instance, the user needs to recognize which finger corresponds to which group.

Figure 19:
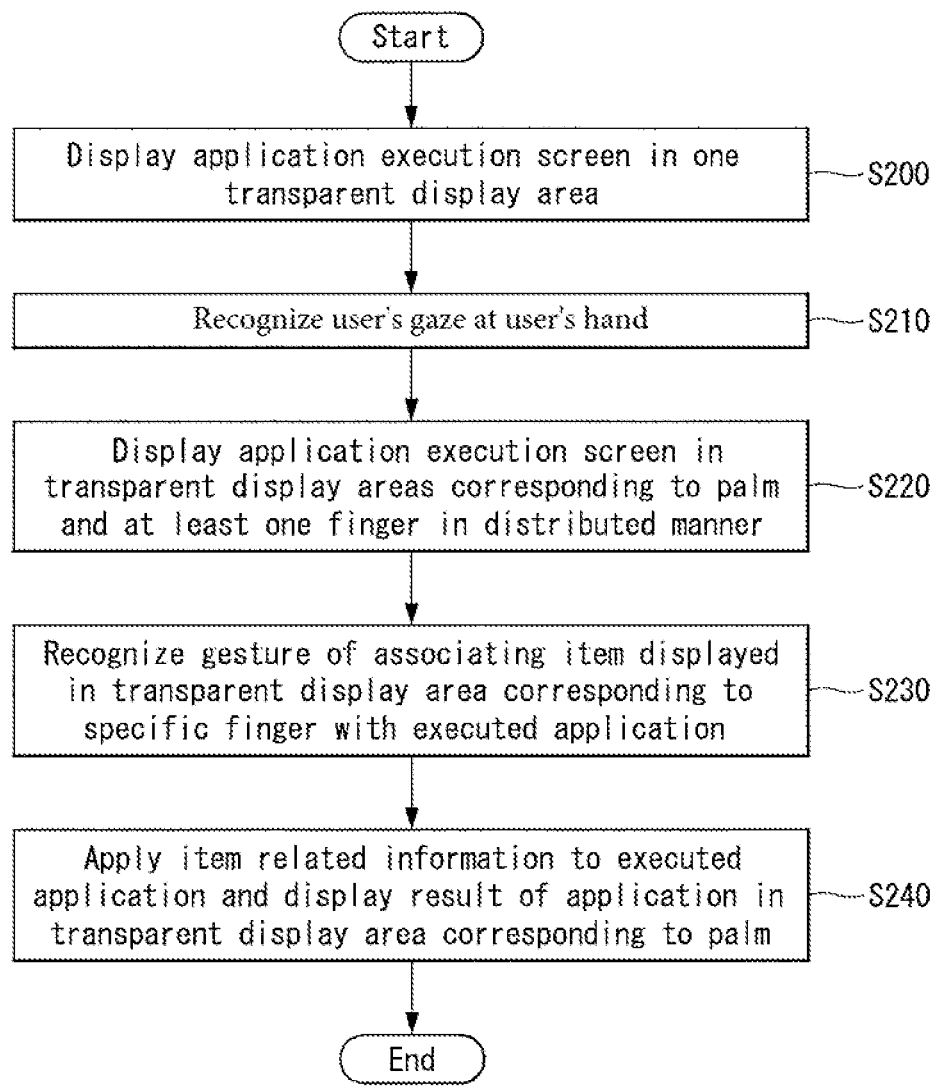
FIG. 19 is a flowchart illustrating another example of the method for controlling the glass type mobile terminal according to an embodiment of the present invention.

FIG. 19 is a flowchart illustrating another example of the method for controlling the glass type mobile terminal 200 according to an embodiment of the present invention. When an application is executed in the glass type mobile terminal 200, the execution screen of the application is displayed in one of transparent display areas of the HMD type display 231 (S200), and the user's gazing at their hand is recognized (S210). The method of recognizing user's gaze at the user's hand has been described with reference to FIGS. 3 and 4, and thus detailed description thereof is omitted.

Upon recognition of user's gaze at the user's hand, the control module 280 segments the application execution screen into parts and displays the segmented parts of the application execution screen in a first transparent area corresponding to the user's palm and at least one second transparent display area corresponding to at least one finger of the user's hand (S220).

A gesture of associating an item displayed on a specific finger with the application is recognized while the application execution screen is segmented and displayed in the aforementioned transparent display areas (S230). This gesture may be identical or similar to the first gesture or the second gesture described in the aforementioned embodiments and thus detailed description thereof is omitted.

Upon recognition of the gesture, the control module 280 applies information related to the item to the application and displays the result of application in the transparent display area corresponding to the user's palm (S240). The result of application of the information to the application may depend on the type of the item displayed on the finger.

That is, according to the method for controlling the glass type mobile terminal 200 shown in FIG. 19, the display region of the execution screen of the executed application is distributed to a plurality of transparent display areas including the transparent display area corresponding to the user's palm and a transparent display area corresponding to at least one finger. In addition, the function of the executed application is performed through a gesture of associating the transparent display areas corresponding to the finger and the palm.

Figure 20:
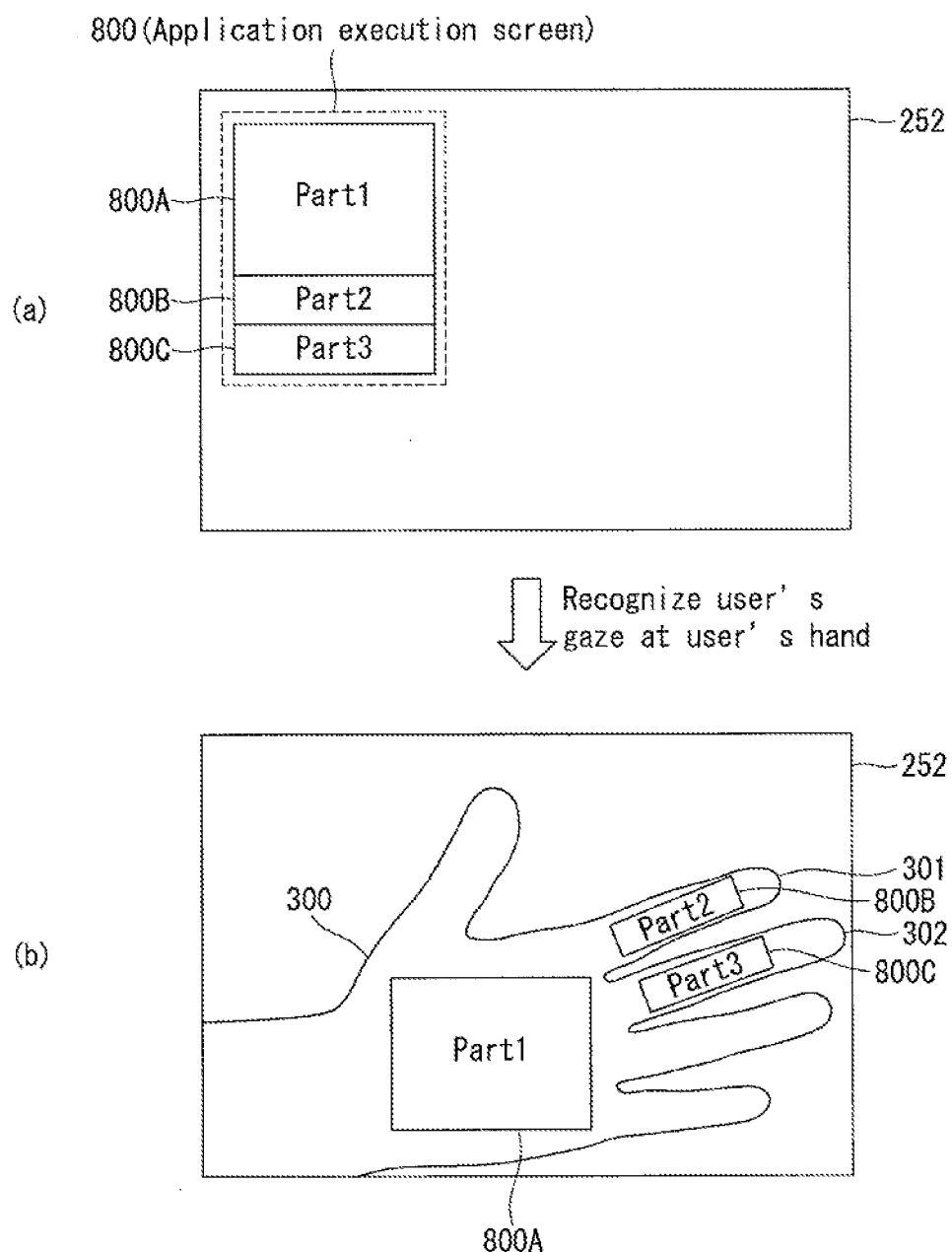
Figure 21:
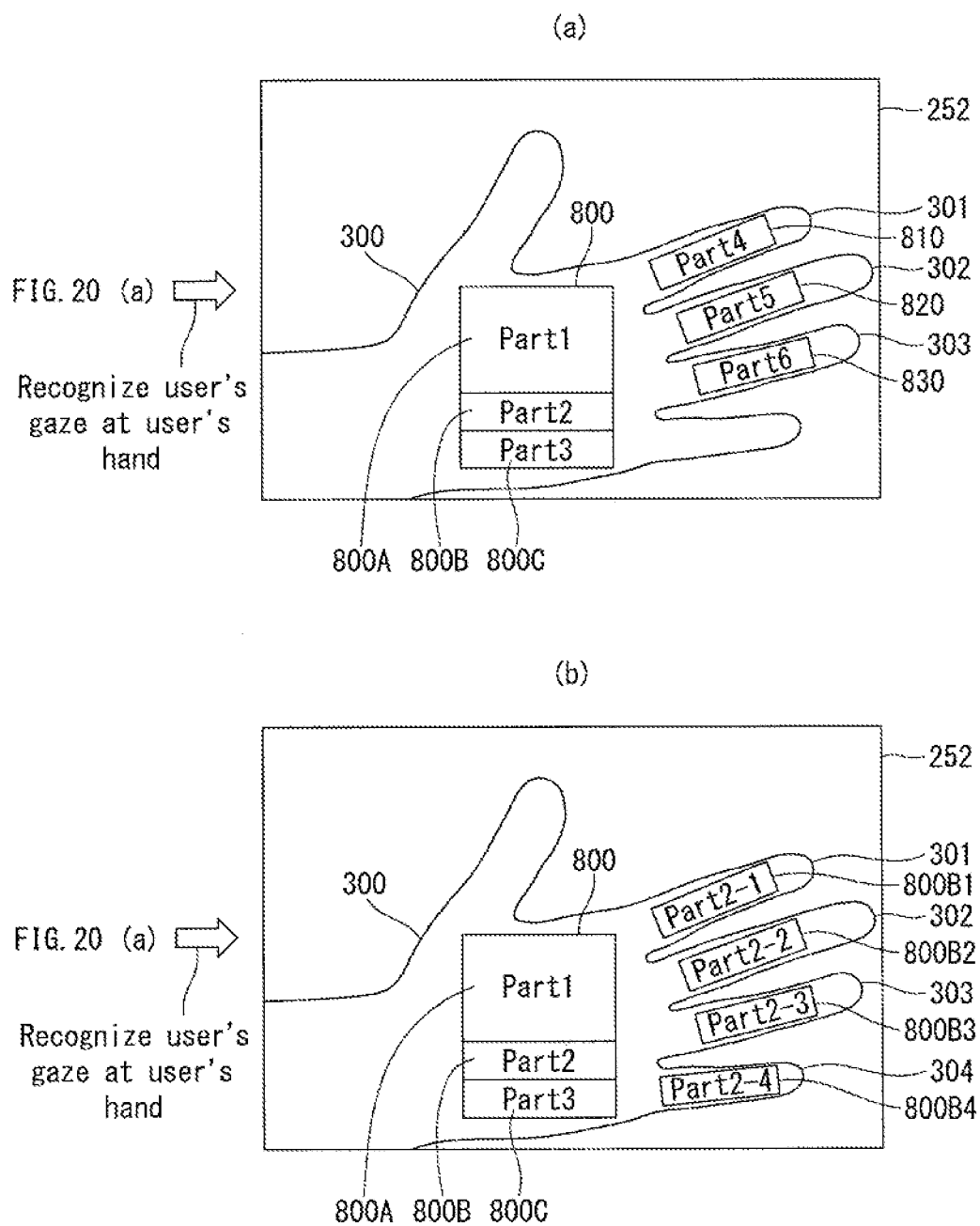

FIGS. 20-22 illustrate an example of segmenting an application execution screen and displaying the segmented application execution screen according to the glass type mobile terminal 200 shown in FIG. 19. FIG. 20(a) illustrates display of an execution screen 800 of an executed application in a region of the transparent display area 252 of the display 231. The user's gaze at the user's hand is recognized in the state shown in FIG. 20(a).

Then, the control module 280 can display part 800A of the application execution screen 800 in the transparent display area corresponding to the user's palm and respectively display the remaining parts 800B and 800C in transparent display areas corresponding to the index finger 301 and the middle finger 302.

Here, the part 800A of the execution screen 800 may be a main graphical user interface (GUI) of the application and the remaining parts 800B and 800C of the execution screen may be sub-GUIs of the application. The main GUI of the application may be a region in which a result of execution of a main function of the application is displayed and a sub-GUI of the application may be a region necessary to execute an additional function of the application. For example, a main GUI of the web browsing application may be a region in which a webpage is displayed and a sub-GUI thereof may be a region in which an address window, a search window or the like is displayed.

Referring to FIG. 21(a), upon recognition, of user's gaze at the user's hand, the control module 280 can display the application execution screen 800 in the transparent display area corresponding to the user's palm and display other parts 810, 820 and 830 of the application execution screen in transparent display areas corresponding to the index linger 301, middle finger 302 and ring finger 303.

Referring to FIG. 21(b), upon recognition of user's gaze at the user's hand, the control module 280 can display the application execution screen 800 in the transparent display area corresponding to the user's palm and display some sub-items 800B1 to 800B4 of the application execution screen 800 in transparent display areas corresponding to a plurality of fingers 301 to 304.

Referring to FIG. 22(a), upon recognition of user's gaze at the user's hand, the control module 280 can display another execution screen 900 of the application in the transparent display area corresponding to the user's palm and respectively display parts 910, 920 and 930 related to the execution screen 900 in transparent display areas corresponding to a plurality of fingers 302 to 304.

Referring to FIG. 22(b), upon recognition of user's gaze at the user's hand, the control module 280 can display part 800' of the execution screen 800 in the transparent display area corresponding to the user's palm and respectively display items 840, 850 and 860 applicable to the application and remaining part 800C of the execution screen 800 in transparent display areas corresponding to a plurality of fingers 301 to 304. Display of the application execution screen in the transparent display areas corresponding to the user's palm and some fingers in a distributed manner upon recognition of user's gaze at the user's hand is not limited to the aforementioned examples.

Figure 23:
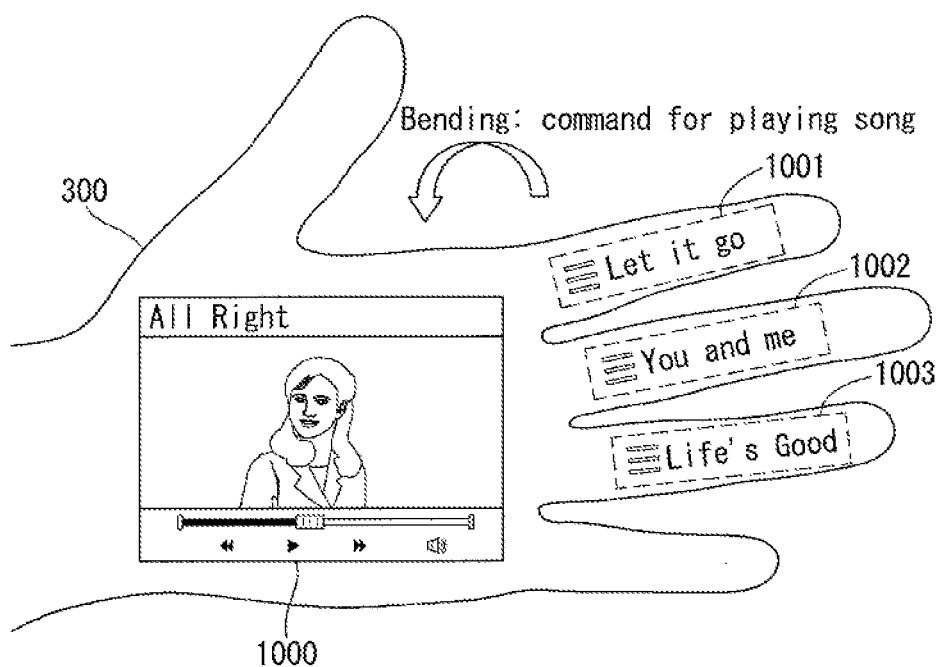
FIG. 23 is an overview illustrating an example of performing the method for controlling the glass type mobile terminal shown in FIG. 22.

FIG. 23 illustrates an example of performing the method for controlling the glass type mobile terminal 200 shown in FIG. 22. Referring to FIG. 23, upon recognition of user's gaze at the user's hand, the control module 280 of the glass type mobile terminal 200 may display a main GUI 1000 of a music player application in the transparent display area corresponding to the user's palm and display a list of play items 1001, 1002 and 1003 in transparent display areas corresponding to some fingers of the user.

When the user bends a specific finger in the state of FIG. 23, the control module 280 can play a song corresponding to the specific finger. Here, the gesture of bending a specific finger is a gesture for applying an item displayed in a transparent display area corresponding to the specific finger to the executed application.

Figure 24:
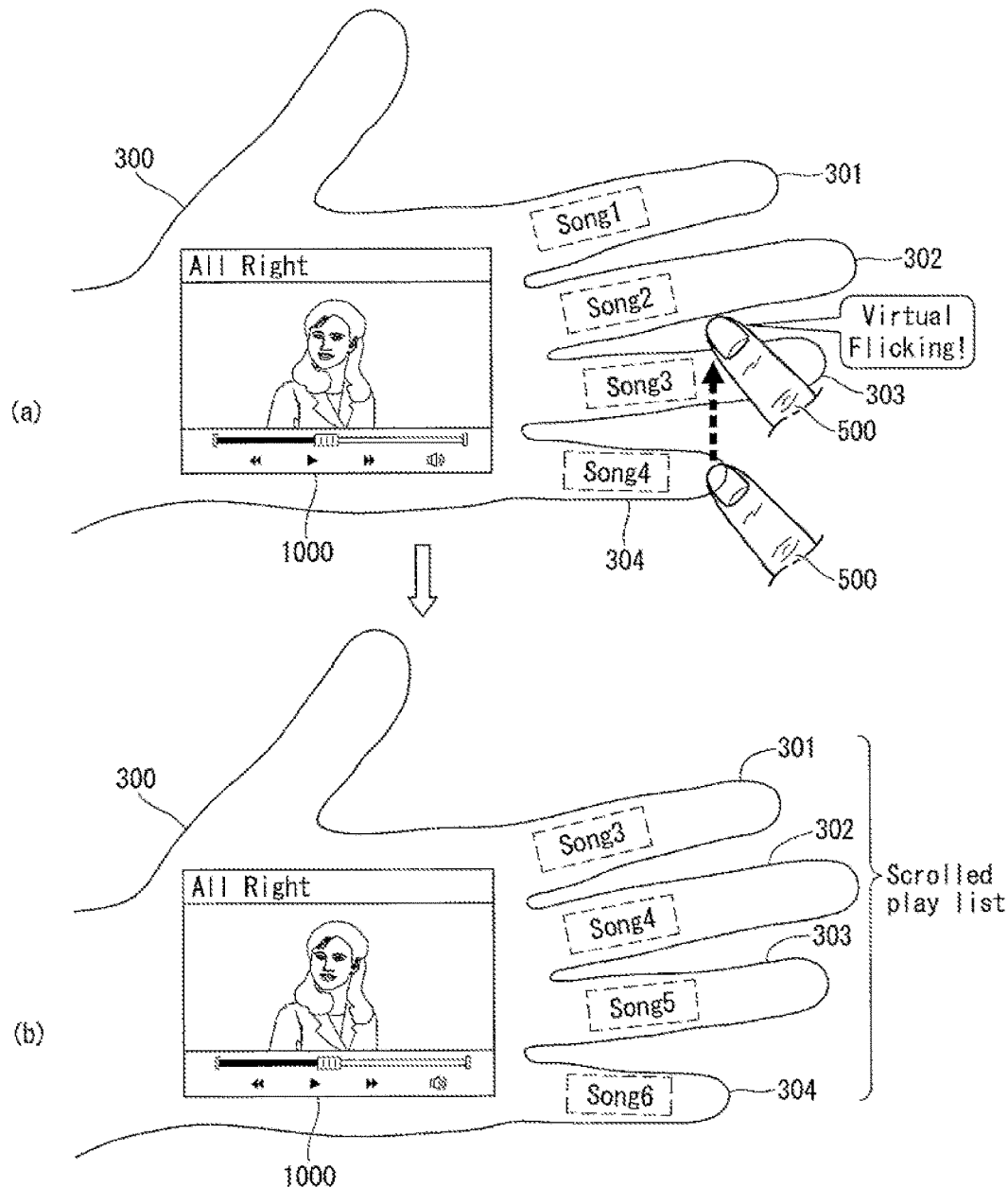
FIG. 24 includes overviews illustrating an example of user interfacing using a finger of the user, provided by the glass type mobile terminal according to an embodiment of the present invention.

FIG. 24 illustrates another example of user interfacing using a finger, which is provided by the glass type mobile terminal 200 according to an embodiment of the present invention. FIG. 24(a) shows that the user performs a virtual flicking gesture while the main GUI 1000 of the execution screen of the music player application is displayed in the transparent display area corresponding to the user's palm and items in a playlist are displayed in transparent display areas corresponding to fingers when the user gazes at the user's hand 300. Then, the control module 280 can execute a playlist scrolling function through the transparent display areas corresponding to the fingers, as shown in FIG. 24(*b*).

Figure 25:
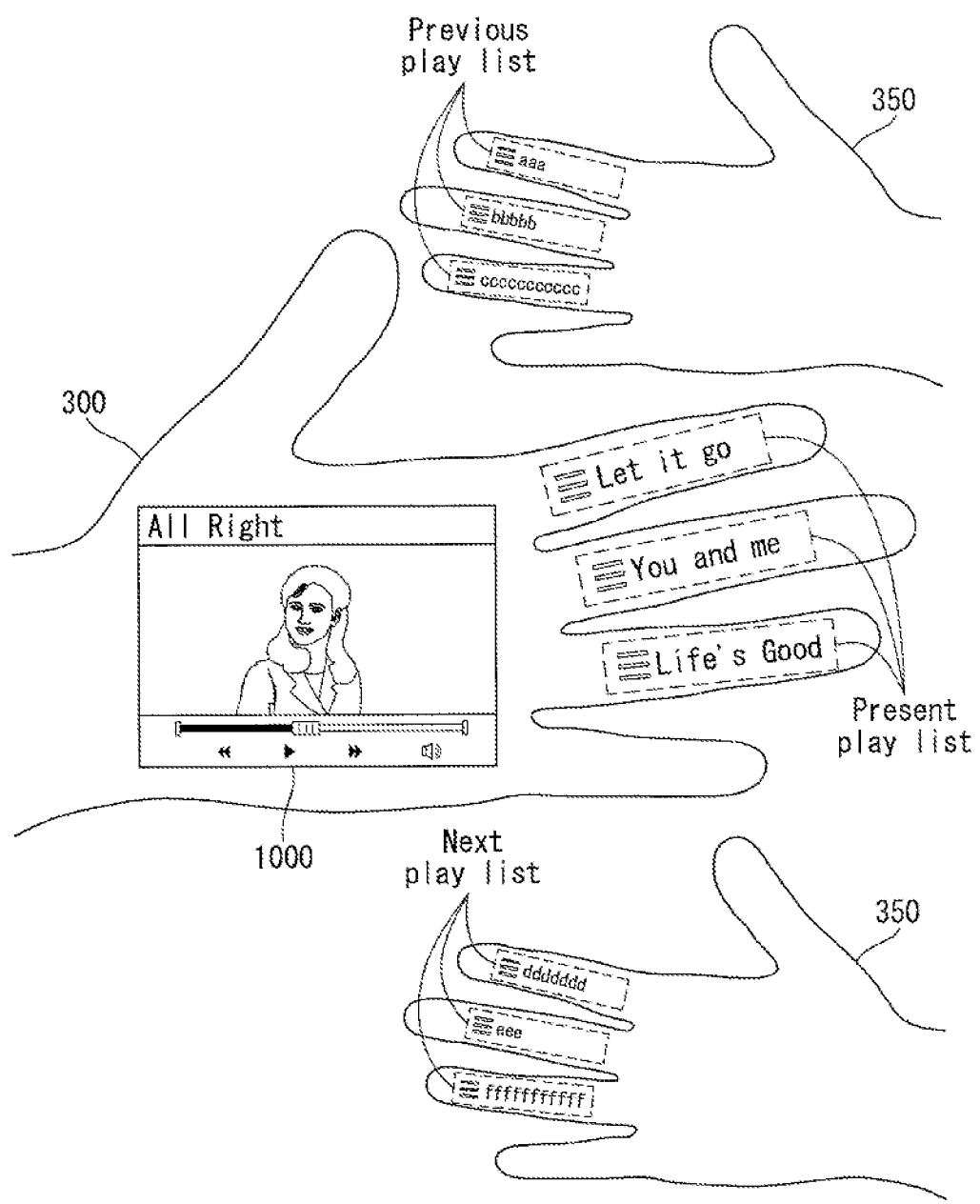
FIG. 25 includes overviews illustrating another example of user interfacing using a finger of the user, provided by the glass type mobile terminal according to an embodiment of the present invention.

FIG. 25 illustrates another example of user interfacing using a finger, which is provided by the glass type mobile terminal 200 according to an embodiment of the present invention. Referring to FIG. 25, upon recognition of user's gaze at the user's left hand 300, the main GUI 1000 of the execution screen of the music player application is displayed in the transparent display area corresponding to the palm of the left hand 300 and items in a playlist are displayed in transparent display areas corresponding to some fingers of the left hand 300.

Here, when the right hand 350 of the user is located above the left hand 300 of the user, the control module 280 can display a previous playlist in transparent display areas corresponding to fingers of the right hand 350. When the right hand 350 of the user is located under the left hand of the user, the control module 280 can display a next playlist in transparent display areas corresponding to fingers of the right hand 350. In the embodiment of FIG. 25, the palm of the right hand 350 may also be used to display the execution screen of the music player application.

As described above with reference to FIG. 25, when one hand of the user is used to display the execution screen of the currently executed application and the other hand is recognized near one hand of the user, the control module 280 can additionally allocate at least one third transparent display area corresponding to the other hand of the user as an area in which the application execution screen is displayed. In addition, the control module 280 can change an item displayed in the third transparent display area according to the position in which the other hand of the user is recognized.

Figure 26:
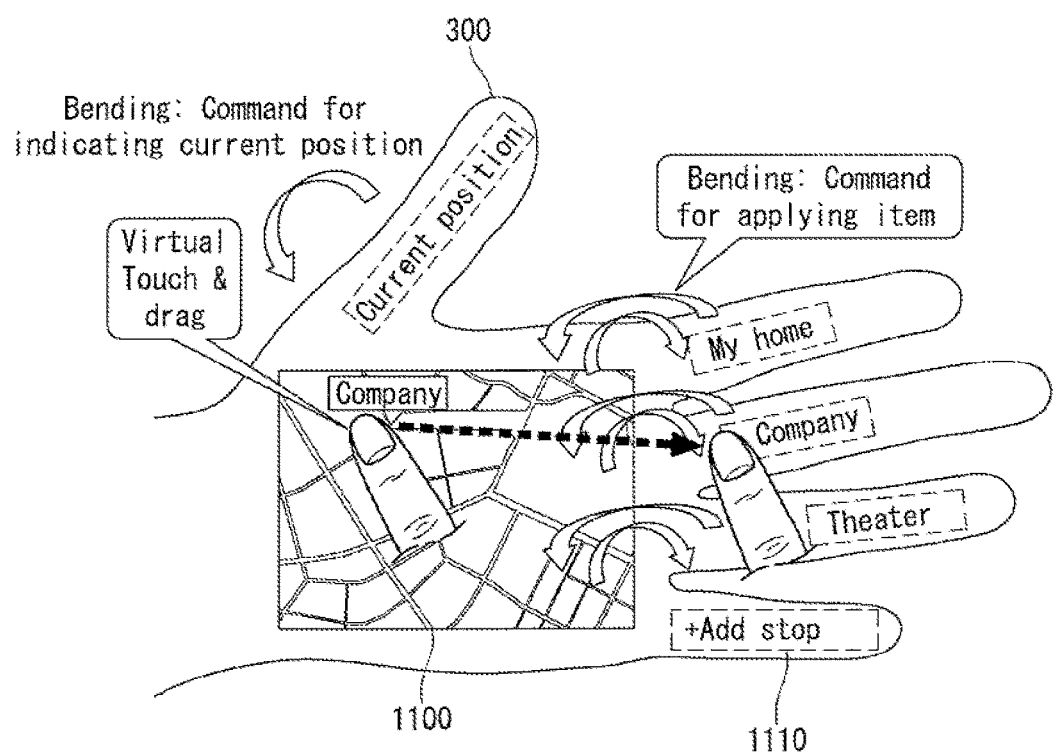
FIG. 26 is an overview illustrating another example of user interfacing using a finger of the user, provided by the glass type mobile terminal according to an embodiment of the present invention.

FIG. 26 illustrates another example of user interfacing using a finger, which is provided by the glass type mobile terminal 200 according to an embodiment of the present invention. FIG. 26 shows that execution screens 1100 and 1110 of a map application are respectively displayed in transparent display areas corresponding to the palm and little finger of the user's left hand 300 upon recognition of user's gaze at the user's left hand 300. When the user drags touch applied to a specific point on the execution screen 1110 with a specific finger in this state, the control module 280 matches the specific finger to the specific point. In the example of FIG. 26, 'my home' is matched to the index finger and 'theater' is matched to the ring finger. While corresponding items are displayed in transparent display areas corresponding to the fingers, items matched to fingers may not be displayed according to implementation form of the present invention.

When the user bends and then un-bends a specific finger in the state shown in FIG. 26, the control module 280 can display a point matched to the specific finger on the map application execution screen 1100. Here, the gesture of bending and then un-bending the specific finger may be a gesture of associating an item displayed on the specific finger with the map application. A gesture of bending the thumb of the user may correspond to a command for displaying the current position on the map.

Figure 27:
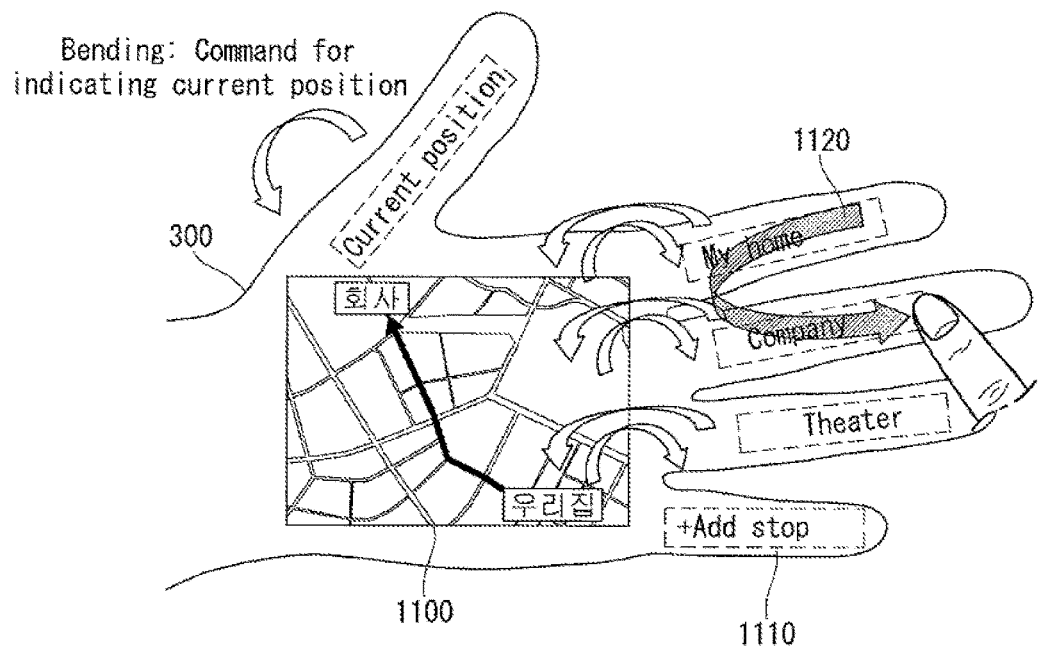
FIG. 27 is an overview illustrating another example of user interfacing using a finger of the user, provided by the glass type mobile terminal according to an embodiment of the present invention.

FIG. 27 illustrates another example of user interfacing using a finger, which is provide by the glass type mobile terminal 200 according to an embodiment of the present invention. It is assumed that the display state of FIG. 27 corresponds to the display state of FIG. 26. When the user performs a gesture 1120 of associating an item corresponding to 'my home' displayed in the transparent display area corresponding to the index finger with an item corresponding to 'company' displayed in the transparent display area corresponding to the middle finger, the control module 280 can execute a function of finding a route from 'my home' to 'company'. When the gesture 1120 is performed on 'company' from the middle finger to the index finger, the control module 280 can find a route from 'company' to 'my home'.

If the gesture starts at the ring finger and reaches the index finger via the middle finger, the control module 280 can find a route from 'theater' to 'my home' via 'company'. That is, upon recognition of the gesture of associating a plurality of items displayed in a plurality of transparent display areas corresponding to the fingers, the control module 280 can apply the items associated by the recognized gesture to execute the application.

Figure 28:
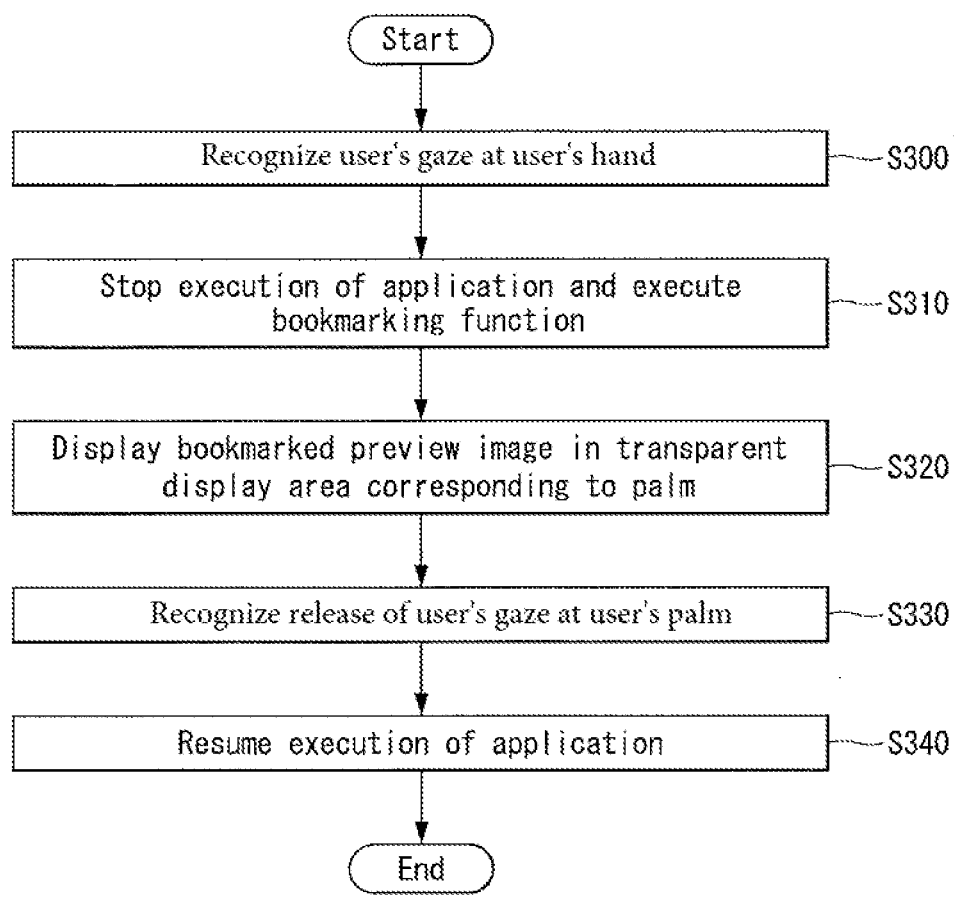
FIG. 28 is a flowchart illustrating another example of the method for controlling the glass type mobile terminal according to an embodiment of the present invention.

FIG. 28 is a flowchart illustrating another example of the method for controlling the glass type mobile terminal 200 according to an embodiment of the present invention. The method for controlling the glass type mobile terminal will now be described with reference to the attached drawings. When user's gaze at the user's hand is recognized while an application is executed and the execution screen of the application is displayed in a predetermined region of the transparent display area of the display 231 (S300), the control module 280 of the glass type mobile terminal 200 stops execution of the application and executes the bookmarking function for the application execution screen (S310).

The control module 280 displays a preview image with respect to the bookmarked application execution screen in the transparent display area corresponding to the user's palm (S320). The application may be a video application, web browsing application, navigation application or the like. However, the scope of the present invention is not limited thereto.

Upon release of user's gaze at the user's hand (S330), the control module 280 resumes execution of the application (S340) and displays the application execution screen in the predetermined transparent display area.

Figure 29:
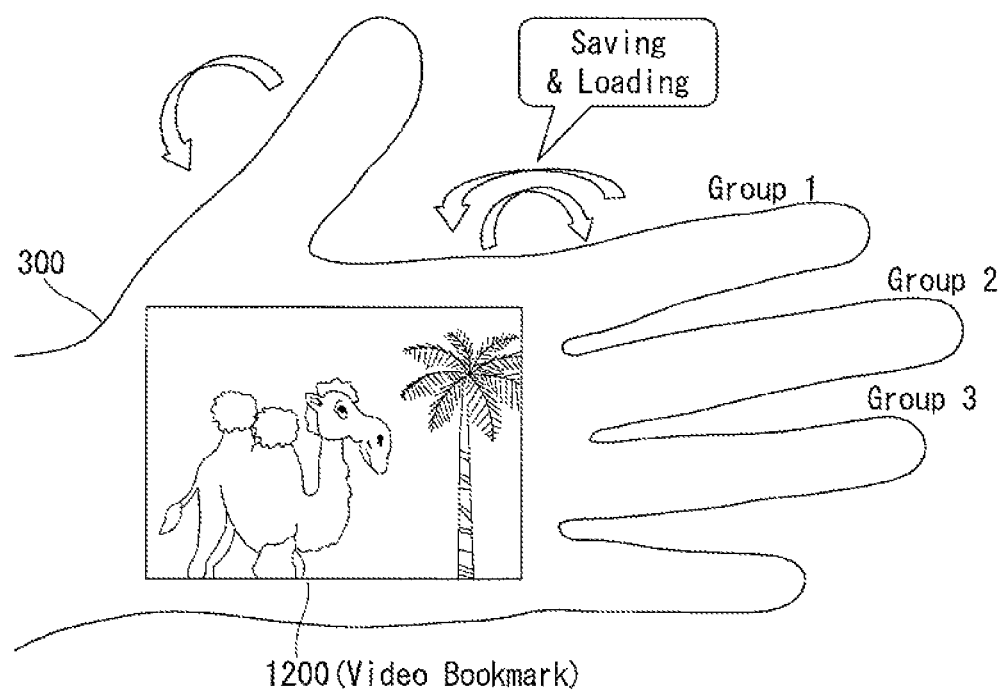
FIG. 29 illustrates a result of execution of a bookmarking function according to the method for controlling the glass type mobile terminal shown in FIG. 28.

FIG. 29 illustrates a result of execution of the bookmarking function according to the method for controlling the glass type mobile terminal 200 shown in FIG. 28. Referring to FIG. 29, upon recognition of user's gaze at the user's hand during execution of a video play application, the control module 280 executes the bookmarking function and displays a video preview image in the transparent display area corresponding to the user's palm as a result of execution of the bookmarking function.

In the state of FIG. 29, the user may associate the preview image with fingers and store the preview image. For example, storing the preview image may be performed by bending and then un-bending a specific finger, dragging a virtual touch applied to the preview image with the specific finger or dragging a virtual touch applied to the specific finger to the preview image. This gesture may be a gesture of associating the result of execution of the bookmarking function with the specific finger.

The control module 280 can display an item indicating execution of the bookmarking function in a transparent display area corresponding to a specific finger, which is not shown in FIG. 29. For example, when the bookmarked preview image is stored in group 1 matched to the index finger, the control module 280 can display an item indicating group 1 in the transparent display area corresponding to the index finger.

Upon recognition of a gesture for associating the specific finger displaying the bookmarking result with the application, the control module 280 can execute the application by applying the bookmarking result thereto. This gesture may be identical or similar to the aforementioned gesture for storing the bookmarking result. However, the scope of the present invention is not limited thereto.

More specifically, when the bookmarked preview image 1200 is associated with the index finger and stored, the control module 280 can play the corresponding video from the point corresponding to the preview image 1200 upon user's gesture of bending the index finger.

The user's gesture of bending the thumb may be a gesture for returning to the initial screen. For example, the user bends the thumb while the preview image 1200 is displayed in the transparent display area corresponding to the user's palm, the control module 280 can resume execution of the video play application and display the execution screen of the video play application in the original position in which the video play application is displayed. This can be performed irrespective of whether the user gazes at their hand.

Figure 30:
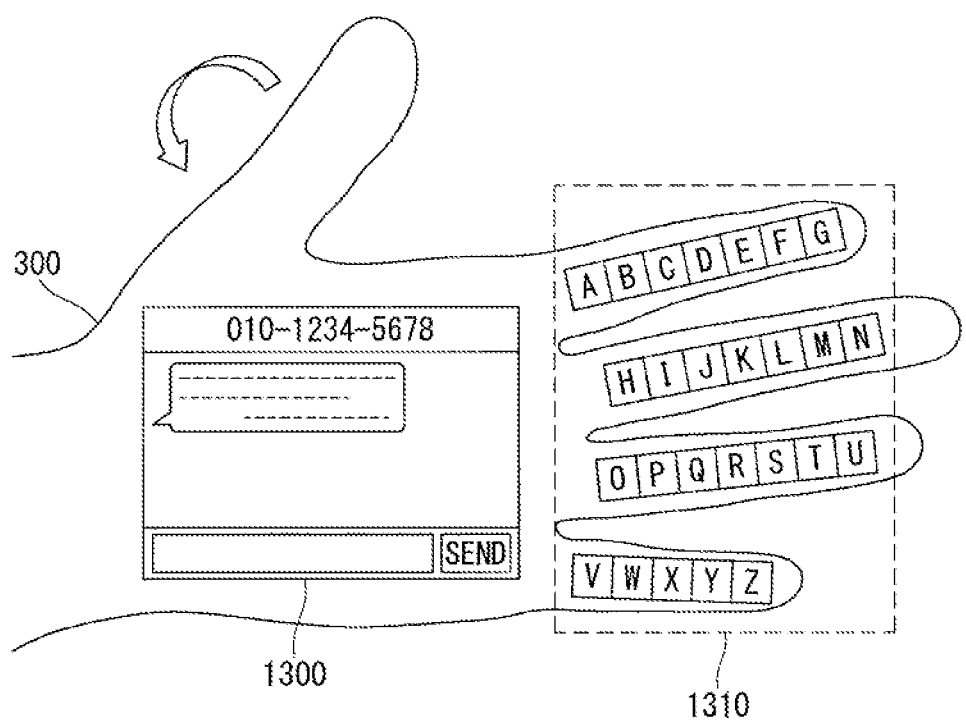
FIG. 30 illustrates another example of user interfacing using a finger of the user, provided by the glass type mobile terminal according to an embodiment of the present invention.

FIG. 30 illustrates another example of user interfacing using a finger, which is provide by the glass type mobile terminal 200 according to an embodiment of the present invention. When user's gaze at the user's left hand 300 is recognized while a message creation application is executed and the execution screen of the message creation application is displayed in at least part of the transparent display area, the control module 280 of the glass type mobile terminal 200 displays at least part 1300 of the execution screen in the transparent display area corresponding to the user's palm and displays a keyboard for inputting a message in transparent display areas corresponding to fingers in a distributed manner, as shown in FIG. 30.

Upon reception of virtual touch applied through the keyboard in the state of FIG. 30, the control module 280 can perform a function corresponding to a function executed when the key corresponding to the received touch is selected. The user's gesture of bending the thumb may be a gesture of returning to the initial screen. For example, when the user bends the thumb in the state of FIG. 30, the control module 280 can return the display state of the execution screen of the message creation application to the original state. This can be performed irrespective of whether the user gazes at their hand.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A glasses type mobile terminal, comprising:
a camera configured to obtain an image;
a display unit including a transparent display; and
a controller configured to:
recognize a user is gazing at their hand via the image obtained by the camera, display an execution screen of a currently executed application in a first transparent display area of the transparent display corresponding to a palm of the hand obtained by the camera, upon recognition of the user gazing at their hand,
recognize a first gesture corresponding to a virtual connection between the displayed execution screen and a specific finger of the hand,
associate the execution screen of the application with the specific finger upon recognition of the first gesture,
display a first item indicating association of the execution screen of the application with the specific finger in a second transparent display area corresponding to the specific finger,
recognize a second gesture of virtually connecting the first item with the displayed execution screen corresponding to the palm of the hand, and
display a result of executing the first item to the application in the first transparent display area.

2. The glasses type mobile terminal of claim 1, wherein the first gesture includes dragging a virtual touch applied to the execution screen of the application by a finger of the other hand of the user to a region corresponding to the specific finger, and the second gesture includes dragging a virtual touch applied to the first item by a finger of the other hand of the user to the execution screen of the application.

3. The glasses type mobile terminal of claim 2, wherein the controller is further configured to:
execute a bookmarking function for the execution screen of the application and display the first item indicating the execution of the bookmarking function in the second transparent display area corresponding to the specific finger, upon recognition of the first gesture, and
display the bookmarked application execution screen in the first transparent display area corresponding to the palm, upon recognition of the second gesture.

4. The glasses type mobile terminal of claim 2, wherein the first gesture corresponds to the virtual connection between a specific item in the displayed execution screen of the application and the specific finger.

5. The glasses type mobile terminal of claim 4, wherein the first item indicates the specific item is stored or deleted in a specific folder allocated to the specific finger.

6. The glasses type mobile terminal of claim 5, wherein the controller is further configured to:
open the specific folder through the application, and display an open screen of the specific folder in the first transparent display area corresponding to the palm, upon recognition of the second gesture.

7. The glasses type mobile terminal of claim 1, wherein the controller is further configured to:
update the first item based on the first or second gesture.

8. The glasses type mobile terminal of claim 7, wherein the updated first item indicates a data item stored or deleted in a specific folder allocated to the specific finger.

9. A glasses type mobile terminal, comprising:
a camera configured to obtain an image;
a display unit including a transparent display; and
a controller configured to:
display an execution screen of a currently executed application in a region of a transparent display area of the display unit,
recognize a user is gazing at their hand via the image obtained by the camera, and
display part of the execution screen in a first transparent display area of the transparent display corresponding to a palm of one hand obtained by the camera, and display the remaining parts of the execution screen in at least one second transparent display area corresponding to a finger of the one hand, upon recognition of the user gazing at their hand,
wherein a main graphical user interface (GUI) of the execution screen is displayed in the first transparent display area, and a sub-GUI of the execution screen of the application is displayed in the at least one second transparent display area, and
wherein, upon recognition of the other hand of the user near the one hand, the controller is further configured to additionally set at least one third transparent display area corresponding to the other hand of the user as an area in which the execution screen of the application is displayed.

10. The glasses type mobile terminal of claim 9, wherein the controller is further configured to display the execution screen of the application in one transparent display area prior to the recognition of the user gazing at their hand.

11. The glasses type mobile terminal of claim 9, wherein the controller is further configured to:
display an item applicable to the application in the at least one second transparent display area, and
execute the application by applying the item thereto upon recognition of a gesture for associating the item displayed in the at least one second transparent display area with the application.

12. The glasses type mobile terminal of claim 9, wherein the controller is further configured to:
display a plurality of items applicable to the application in second transparent display areas corresponding to fingers of the user, and
upon recognition of a gesture for associating the plurality of items, execute the application by applying the associated items thereto.

13. The glass type mobile terminal of claim 9, wherein the controller is further configured to change an item displayed in the at least one third transparent display area according to a position in which the other hand of the user is recognized.

14. A glasses type mobile terminal, comprising:
a camera configured to obtain an image;
a display unit including a transparent display; and
a controller configured to:
recognize a user is gazing at their hand via the image obtained by the camera,
stop execution of an application, execute a bookmarking function for an execution screen of the application and display a preview image with respect to the bookmarked application execution screen in a transparent display area corresponding to a palm of the user's hand, upon the recognition of the user gazing at their hand while the execution screen of the application is displayed in a predetermined transparent display area, and
resume execution of the application and display the execution screen of the application in the predetermined transparent display area upon recognition the user is no longer gazing at their palm.

15. The glasses type mobile terminal of claim 14, wherein the controller is further configured to store a bookmarking result in association with a specific finger of the user's hand.

16. The glasses type mobile terminal of claim 15, wherein the controller is further configured to store the bookmarking result in association with the specific finger of the user's hand upon recognition of a gesture of associating the bookmarking result with the specific finger.

17. The glasses type mobile terminal of claim 14, wherein the controller is further configured to display an item indicating the execution of the bookmarking function in a transparent display area corresponding to the specific finger.

18. The glasses type mobile terminal of claim 14, wherein the controller is further configured to execute the application by applying the bookmarking result associated with the specific finger thereto upon recognition of a gesture of associating the specific finger with the application.

* * * * *